(12) United States Patent
Thai et al.

(10) Patent No.: US 12,040,975 B2
(45) Date of Patent: Jul. 16, 2024

(54) METHOD AND APPARATUS FOR BLOCKCHAIN BASED ON INFORMATION-CENTRIC NETWORKING

(71) Applicant: ELECTRONICS AND TELECOMMUNICATIONS RESEARCH INSTITUTE, Daejeon (KR)

(72) Inventors: Quang Tung Thai, Daejeon (KR); Nam Seok Ko, Daejeon (KR); Sun Me Kim, Daejeon (KR); Sung Hyuk Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 341 days.

(21) Appl. No.: 17/503,800

(22) Filed: Oct. 18, 2021

(65) Prior Publication Data

US 2022/0150169 A1 May 12, 2022

(30) Foreign Application Priority Data

Nov. 6, 2020 (KR) ......................... 10-2020-0147529
Sep. 23, 2021 (KR) ......................... 10-2021-0125916

(51) Int. Cl.
*H04L 45/7453* (2022.01)
*G06F 16/23* (2019.01)
*H04L 67/568* (2022.01)

(52) U.S. Cl.
CPC ...... *H04L 45/7453* (2013.01); *G06F 16/2379* (2019.01); *H04L 67/568* (2022.05)

(58) Field of Classification Search
CPC ............................ G06F 16/2379; H04L 67/568
(Continued)

(56) References Cited

U.S. PATENT DOCUMENTS 6,192,377 B1 * 2/2001 Ganesh ............... G06F 16/2329
                                                        707/999.203
10,887,309 B2    1/2021 Huh et al.
(Continued)

FOREIGN PATENT DOCUMENTS

CN         107317842 A     11/2017
EP           2705694 B1     1/2018
(Continued)

OTHER PUBLICATIONS

Korean Office Action issued on Dec. 5, 2022, in counterpart Korean Patent Application No. 10-2021-0125916 (6 pages in Korean).
(Continued)

*Primary Examiner* — Hermon Asres
(74) *Attorney, Agent, or Firm* — NSIP Law

(57) ABSTRACT

The present invention relates to a method for announce-pull data broadcasting in a blockchain based on information-centric networking (ICN). The present invention includes, transmitting announcement messages to notify having any data in the format of an ICN Interest packet, by a blockchain node, to the blockchain node's peers; receiving, by the blockchain node, data request messages, which request the data, from the blockchain node's peers, wherein data request messages for the same ICN Data packet receiving from multiple blockchain nodes can be aggregated at a middle ICN node; and transmitting, by the blockchain node, the ICN Data packet corresponding to the data request message to the blockchain node's peers, wherein the ICN Data packets can cached at the middle ICN node.

15 Claims, 19 Drawing Sheets

(58) Field of Classification Search
USPC .......................................................... 370/392
See application file for complete search history.

(56) References Cited

U.S. PATENT DOCUMENTS

| | | | |
|---|---|---|---|
| 2017/0331837 A1 | 11/2017 | Moon et al. | |
| 2019/0182029 A1 | 6/2019 | Yim et al. | |
| 2019/0318346 A1* | 10/2019 | Ben-David | ............. H04L 9/006 |
| 2019/0319964 A1* | 10/2019 | Smith | ..................... H04L 69/22 |
| 2021/0111997 A1* | 4/2021 | Nainar | .................... H04L 45/42 |

FOREIGN PATENT DOCUMENTS

| | | |
|---|---|---|
| EP | 3 611 879 A1 | 2/2020 |
| JP | 2017-211850 A | 11/2017 |
| KR | 10-2014-0022075 A | 2/2014 |
| KR | 10-2016-0069432 A | 6/2016 |
| KR | 10-2019-0062859 A | 6/2019 |

OTHER PUBLICATIONS

Zhu, Zhenkai, et al., "Let's ChronoSync: Decentralized Dataset State Synchronization in Named Data Networking," *2013 21st IEEE International Conference on Network Protocols (ICNP)*. IEEE, 2013 (pp. 1-10).

Jin, Tong, et al., "BlockNDN: A Bitcoin Blockchain Decentralized System over Named Data Networking," *2017 Ninth international conference on ubiquitous and future networks (ICUFN)*, IEEE, 2017 (pp. 1-6).

Thai, Quang Tung et al., "NDN-based Ethereum Blockchain", Electronics and Telecommunications Research Institute, Dec. 1, 2020 (pp. 1-19).

* cited by examiner

METHOD AND APPARATUS FOR BLOCKCHAIN BASED ON INFORMATION-CENTRIC NETWORKING

CROSS REFERENCE TO RELATED APPLICATION

The present application claims priority to KR application 10-2020-0147529, filed Nov. 6, 2020 and KR application 10-2021-0125916, filed Sep. 23, 2021, the entire contents of which are incorporated herein for all purposes by this reference.

BACKGROUND OF THE INVENTION

Field

The present disclosure relates to a method and apparatus for blockchain, and more particularly, to a method and apparatus for blockchain based on information-centric networking.

Description of Related Art

In Information-centric networking (ICN), data are requested and forwarded using names of data with no connection between terminals. Named data networking (NDN) is one of the representative technologies for ICN.

In ICN, names can be allocated hierarchically to prevent redundancy between each content, and transmission is performed based on such names. In such a structure, when generating contents, the contents are published based on names allocated to each content, and data are forwarded at a request of a content under its name.

Data communication in the TCP/IP based blockchain (specifically Ethereum client) is implemented on a P2P overlay. Data such as transactions or blocks are broadcasted to the whole network by propagating in a hop-by-hop manner. When data arrives at a node, it is validated and multicast to a few neighboring peers. This broadcast mechanism is not efficient and usually incurs an unnecessary bandwidth because data are sent redundantly.

The present invention is proposed to solve this problem in a network layer protocol by using ICN. Since NDN is a representative technology of ICN, the present invention is described based on NDN. In the existing NDN-based solutions, the data broadcasting in a blockchain was framed as a data synchronization problem as all blockchain clients aim to retrieve the same set of data. However, the approach has several issues as follows.

First, these synchronization protocols require the setting up of a globally common prefix for all participant nodes. By naming data uniquely, in-network caching is fully utilized. However, fulfilling this requirement is a big challenge for a blockchain network.

Prefix registration at NFD is a policy-based process where each node is required to possess a right to announce its prefix to another node. Therefore, there is an insurmountable cost of deployment for a blockchain network having a very large number of public nodes.

Second, these protocols utilize a multicast forwarding strategy for broadcasting data. That is, whenever a participant node wants to notify other peers of its current state, it sends a single Interest to the network, and the Interest is multicast to all peers capable of receiving the Interest's prefix. This strategy works only if the multicast forwarding strategy is enabled in all forwarding engines (NFDs) of all NDN nodes at intermediate routers.

Third, the security of the blockchain system itself is a problem. Using a broadcast method is prone to flooding attacks on the blockchain network. A malicious node may broadcast abnormal pieces of data to other peers, asking them to waste time and computation on unnecessary works.

Therefore, the existing technologies have problems of redundant transmission of same data and degradation of security.

SUMMARY

An objective of the present disclosure is to provide a method and apparatus for blockchain based on information-centric networking (ICN). According to the method and apparatus for blockchain, a specific node announces to other nodes that it possesses a data. When the specific node receives, from a node that received the announcement, a message requesting the data, the specific node transmits the data to the data-requesting node. The data-requesting node validates the received data after it receives the data from the specific node, and the data are not broadcasted unless verified valid.

An objective of the present disclosure is to provide a method and apparatus for blockchain, by which transactions and blocks may have unique names and a specific node may aggregate each Interest packet.

An objective of the present disclosure is to provide a method and apparatus for blockchain, by which transactions and blocks may have unique names and a specific node may cache data and transmit the cached data to an individual destination node.

Other objectives and advantages of the present disclosure will become apparent from the description below and will be clearly understood through embodiments of the present disclosure. Also, it will be easily understood that the objectives and advantages of the present disclosure may be realized by means of the appended claims and a combination thereof.

According to an embodiment of the present invention, a method for announce-pull data broadcasting in a blockchain based on named data networking (NDN), a realization of ICN, may include: transmitting, by a blockchain node, a data announcement message in the form an NDN Interest packet, which indicates that the blockchain node possesses a data, to the blockchain node's peers; receiving, by the blockchain node, a data request message in the form of an NDN Interest packet, which requests the data, from one of the blockchain node's peers, wherein the same NDN Data packets from the blockchain node's peers can be aggregated at a middle NDN node; and transmitting, by the blockchain node, a data response message in the form of an NDN Data packet, which encloses the data corresponding to the data request message, wherein the NDN Data packets can be cached at the middle NDN node.

According to an embodiment of the present invention, the method may further include: validating, by a blockchain node, data integrity of the received NDN Data packet, when receiving an NDN Data packet; and announcing, by a blockchain node, the validated NDN Data packet to the blockchain node's peers.

According to an embodiment of the present invention, the method may further include validating the data integrity based on a hash value included in the data name against the hash value calculated from the received Data packet.

According to an embodiment of the present invention, the method may further include determining that the data integrity is validated, when the hash value comprised in the data name and the hash value calculated from the received Data packet are the same.

According to an embodiment of the present invention, the announcement message comprises at least one of a transaction announcement message or a block announcement message.

According to an embodiment of the present invention, the announcement message comprises a hash value of a data, which is available as a unique identifier of data.

According to an embodiment of the present invention, the method may further include transmitting, by a blockchain node, transaction announcement messages to the blockchain node's peers; receiving, by the blockchain node, a transaction request message corresponding to the transaction announcement message from the peer of the blockchain node that received the transaction announcement message; inserting, by the blockchain node, a transaction corresponding to the received transaction request message into an NDN Data packet; and transmitting, by the blockchain node, a transaction response message comprising the NDN Data packet to the blockchain node's peer that sent the transaction request message, wherein the blockchain node's peer receives the transaction response message, extracts a transaction comprised in the transaction response message, and adds the transaction to its list.

According to an embodiment of the present invention, the method may further include announcing, by a transaction pull module of the blockchain node, new transactions also to a miner module, whenever new transactions are added.

According to an embodiment of the present invention, the method may further include mining a new block, by a miner module of the blockchain node, that comprises newly added transactions.

According to an embodiment of the present invention, the method may further include transmitting, by the controller of the blockchain node's peer that received a transaction announcement, a response for the transaction announcement to the blockchain node through the NDN transport module, when the transaction announcement message is verified normal.

According to an embodiment of the present invention, the method may further include transmitting, by the controller of the blockchain node's peer that received a transaction announcement, a dummy Data packet to the blockchain node as a response for the transaction announcement.

According to an embodiment of the present invention, the method may further include receiving, by the transaction fetcher module of a blockchain node, multiple announcements from other blockchain nodes concurrently.

According to an embodiment of the present invention, the method may further include encapsulating, by an NDN transport module of the blockchain node, a transaction in the NDN Data packet.

According to an embodiment of the present invention, a method for processing a block in a blockchain based on NDN, may further include: transmitting, by a blockchain node, a block announcement message to the blockchain node's peers; receiving, by the blockchain node, a block request message corresponding to the block announcement message from the blockchain node's peers that received the block announcement message; inserting, by the blockchain node, a block corresponding to the block request message into an NDN Data packet; and transmitting, by the blockchain node, a block response message comprising the NDN Data packet to the blockchain node's peer that sent the block request message, validating, by blockchain node's peers that receive the block response message, the block included in the block response message.

According to an embodiment of the present invention, the method may further include transmitting, by the controller of the blockchain node's peer which received a block announcement of the blockchain node, a response for a block announcement of the blockchain node to the blockchain node through an NDN transport module, when the block announcement message is verified normal.

According to an embodiment of the present invention, the method may further include transmitting, by the controller, a dummy Data packet to the blockchain node as a response for the announcement of the blockchain node.

According to an embodiment of the present invention, the method may further include receiving, by a block fetcher module of a blockchain node, multiple block announcements from other blockchain nodes concurrently.

According to an embodiment of the present invention, the method may further include encapsulating, by an NDN transport module of the blockchain node, a block in an NDN Data packet.

According to an embodiment of the present invention, the method may further include adding, by the block fetcher module of a blockchain node, a newly fetched block to a local blockchain by periodically requesting block insertion to a chain manager module.

The features briefly summarized above with respect to the invention are merely exemplary aspects of the detailed description of the invention that follows, and do not limit the scope of the invention.

According to the present disclosure, a specific blockchain node announces to other blockchain nodes that it possesses data. When the specific node receives, from a blockchain node that received the announcement, a message requesting the data, the specific node transmits the data to the blockchain node that requests the data. The blockchain node validates the data after it receives the data from the specific node, and the data are not broadcast unless verified valid so that security may be improved when data are broadcast.

According to the present disclosure, as transactions and blocks may have unique names and a specific node may aggregate Interest packets for the same data name, the efficiency of data requesting may be improved.

According to the present disclosure, as transactions and blocks may have unique names, and as Data packets are cached at a specific node and the cached data packets are transmitted to an individual destination node, data redundancy may be reduced.

According to the present disclosure, as unique names are designated to blockchain data so that in-network caching and basic multicasting functions of NDN technology become possible, the traffic redundancy unavoidable in the IP-based Ethereum blockchain may be eliminated by means of a new protocol for block and transaction propagation using an advanced function of NDN network.

According to the present disclosure, as the P2P layer is acting as a name resolution system which does the name-to-location mapping for data, the system may function in the NDN platform without any cost of deployment, thereby enhancing its scalability.

According to the present disclosure, any other realization of ICN can be used instead of NDN.

Effects obtained in the present disclosure are not limited to the above-mentioned effects, and other effects not men-

DETAILED DESCRIPTION

Figure 1:
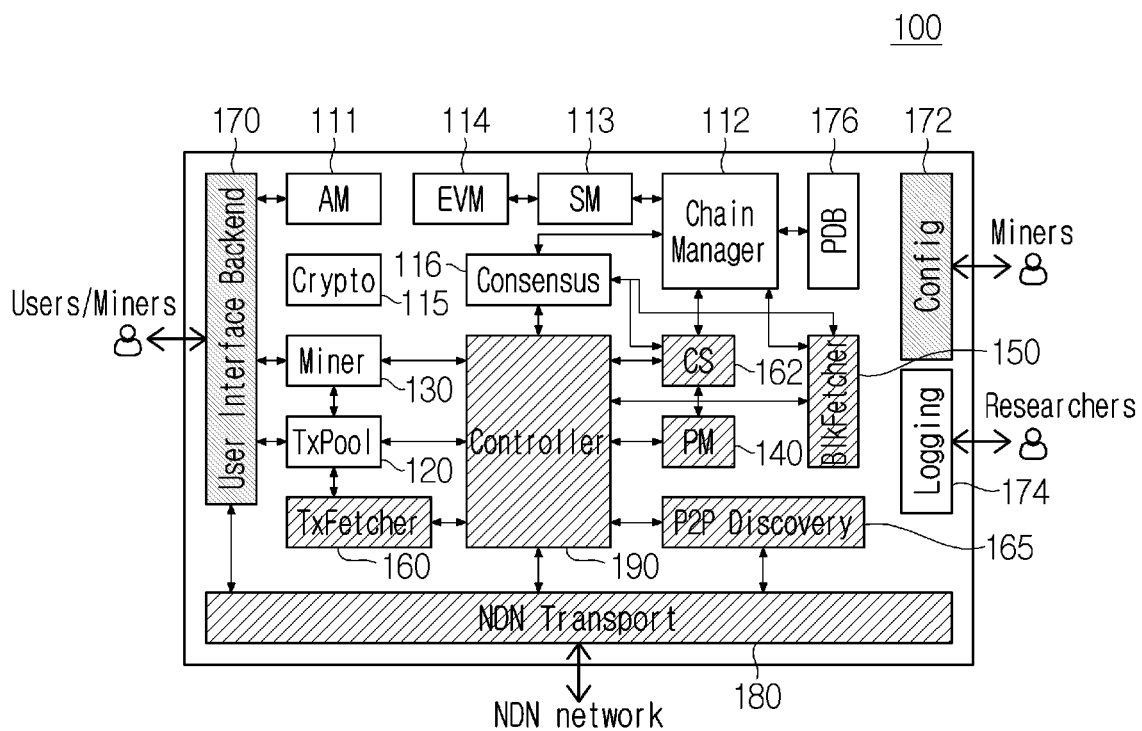
FIG. 1 is a view illustrating an Ethereum blockchain client over NDN according to an embodiment of the present disclosure.

Hereinafter, embodiments of the present disclosure will be described in detail with reference to the accompanying drawings so that those of ordinary skill in the art to which the present disclosure pertains can easily implement them. However, the present disclosure may be implemented in several different forms and is not limited to the embodiments described herein.

In describing an embodiment of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, the components that are distinguished from each other are for clearly explaining each characteristic, and do not necessarily mean that the components are separated. That is, a plurality of components may be integrated to form one hardware or software unit, or one component may be distributed to form a plurality of hardware or software units. Therefore, even if not separately mentioned, such integrated or distributed embodiments are also included in the scope of the present disclosure.

In the present disclosure, components described in various embodiments do not necessarily mean essential components, and some may be optional components. Accordingly, an embodiment composed of a subset of components described in an embodiment is also included in the scope of the present disclosure. In addition, embodiments including other components in addition to components described in various embodiments are also included in the scope of the present disclosure.

In the present disclosure, components described in various embodiments do not necessarily mean essential components, and some may be optional components. Accordingly, an embodiment composed of a subset of components described in an embodiment is also included in the scope of the present disclosure. In addition, embodiments including other components in addition to components described in various embodiments are also included in the scope of the present disclosure.

In the present disclosure, terms such as first, second, etc. are used only for the purpose of distinguishing one component from other components, and unless otherwise specified, the order or importance between the components is not limited. Accordingly, within the scope of the present disclosure, a first component in one embodiment may be referred to as a second component in another embodiment, and similarly, a second component in one embodiment is referred to as a first component in another embodiment.

When a component of the present disclosure is referred to as being "connected" or "connected" to another component, it may be directly connected or connected to the other component. But it should be understood that other components may exist in the middle. On the other hand, when it is said that a certain element is "directly connected" or "directly connected" to another element, it should be understood that there is no other element in the middle.

In addition, in the present disclosure, a description of each drawing may be applied to different drawings unless one drawing showing an embodiment of the present disclosure corresponds to another drawing and an alternative embodiment.

Hereinafter, the present disclosure will be described in more detail with reference to the drawings.

FIG. 1 is a view illustrating an Ethereum blockchain client over NDN according to an embodiment of the present disclosure.

Referring to FIG. 1, a component of a first group is inherited without modifications from an existing Ethereum client. A component of a second group is added to the present invention. A component of a third group is modified from the existing client. The first group has white components, and the second group has light shaded components and includes a user interface backend (UIB) module 170 and a configuration module 172. The third group has dark shaded components.

A client 100 of FIG. 1 includes an account manager (AM) module 111, a chain manager (CM) module 112, a state manager (SM) module 113, a blockchain virtual machine (Ethereum virtual machine (EVM)) module 114, a transaction pool (TxPool) module 120, a miner module 130, a crypto module 115, and a consensus module 116. The client 100 also includes a peer manager (PM) module 140, a block fetcher (BlkFetcher) module 150, a transaction fetcher (TxFetcher) module 160, chain synchronization (CS) 162, a P2P discovery module 165, a user interface backend (UIB) module 170, a configuration module 172, a logging module 174, a persistent database (PDB) module 176, an NDN transport module 180, and a controller 190.

However, the configuration of FIG. 1 is merely illustrative to describe the present disclosure. Accordingly, it is clear that some or all parts of the configuration of FIG. 1 may be integrated and be implemented in a single hardware or software component.

The account manager (AM) 111 may implement an account management feature. The AM 111 may enable the creation/deletion/modification/monitoring of accounts.

The chain manager (CM) module 112 may implement a blockchain data structure. The CM 112 may provide an interface for chain manipulation such as blocks/transaction querying, block insertion and the like.

The state manager (SM) 113 may implement a chain state data structure. The state manager 113 may provide an interface for querying a historical state, updating a new state by execution transactions, and rolling back to a previous state. The chain manager module 112 uses such an interface exclusively when manipulating a chain internal data structure.

The Ethereum virtual machine (EVM) 114 may provide an interface for executing transactions in order to update a chain state. The state manager module 113 uses such an interface exclusively when updating chain states.

The transaction pool (TxPool) module 120 may manage a list of transactions that are buffered for including in a next mining block. Transactions may be either received from users through a user-client direct channel or received from other peers as means of transaction broadcasting over P2P overlay. In the former case, the transactions arrive at the UIB module 170, and in the latter case, the transactions arrive at the controller 190. In this case, the controller 190 requests the TxPool module 120 to add the transactions to its pending list. Periodically, the TxPool module notifies another transaction to another module (who registers reception of a notification). The miner module 130 collects a new transaction for a building block. The controller 190 learns of a new transaction for forwarding it to other peers in the network.

The Miner module 130 may implement a mining function. The miner module 130 may collect a new transaction from the TxPool module 120 and may build a new block. During a block mining process, the miner module 130 may receive a chain event the chain manager module 112 (when a new block was inserted) and an event from the TxPool 120 (when a new batch of transactions is available) in order to refresh a current mining work.

The crypto module 115 may implement a basic cryptographic primitive (such as public/private key utility, hashing, and signature signing/verifying).

The consensus module 116 may implement a consensus protocol of the blockchain. The consensus module 116 may provide the following interfaces for the miner module 130 and the chain manager module 112.

The consensus module 116 finds a proof of work (POW) solution and verifies the found solution. In relation to block creation, the consensus module 116 creates a block header, injects a block body and finalizes block creation by adding customized information. In relation to block validation, the consensus module 116 validates block header, block body, and POW.

The peer manager (PM) module 140 may implement how a node maintains its peers. The PM module 140 may implement an interface for adding and removing peers, which are used by the controller module 190, the BlkFetcher module 150, and the chain synchronizer module 162 for selecting peers to announce and fetch data.

The block fetcher (BlkFetcher) module 150 may implement the block fetching function. When the client receives block announcements from other peers, the BlkFetcher 150 may fetch a block from a peer which forwards an announcement (hereinafter, referred to as "announcing peer"), validate a block header, and then add the block to a next local chain or cache the block for the future when the block is invalid.

The transaction fetcher (TxFetcher) module 160 may implement the transaction fetching function. When the client receives a transaction announcement from another peer, the TxFetcher module 160 may fetch the transaction from the announcing peer and add the transaction to the TxPool module 120.

The chain synchronizer (CS) module 162 may implement the blockchain synchronization function. The CS module 162 may check periodically the synchronization status of the client's local chain and trigger the start of a chain synchronization protocol in case synchronization lost is suspected. During a chain synchronization process, the CS module 162 fetches blockchain data through an interface of the controller 190. The CS module 162 selects a peer to be fetched from the peer manager module 140. The CS module 162 validates the fetched block using an interface of the consensus module. The CS module 162 inserts the block using an interface of the chain manager.

The P2P discovery module 165 may provide the P2P overlay function. The client may discover another peer in a network to build the overlay. The P2P discovery module 165 may implement a P2P algorithm such as Kademlia in order to build a routing table. The routing table may have a list of peers. As a newly discovered peer is notified to the peer manager module 140 through the controller 190, the peer manager module 140 may maintain a specific number of peer lists that may be used for exchanging blockchain messages.

The user interface backend (UIB) 170 may implement a backend service to support APIs for monitoring and controlling the blockchain client. The UIB module 170 may receive commands from a client user through various communication channels such as WebSocket, web services and HTTP, trigger the backend functions to handle the commands, and then return responses to the user.

The configuration (config) module 172 may implement the parsing of input arguments, configuration files, and genesis file.

The logging module 174 may provide a logging function to aid testing and experimental studies. The logging module 174 is used by all other modules that need the logging function.

The persistent database (PDB) module 176 may provide an interface for a key-value backend database for retrieving and storing the blockchain and other data structures such as pending transactions and connected peers. The PDB module 176 may store the blockchain, transactions and chain states in a persistent storage and be used by the state manager, the chain manager, and the TxPool module. At the start of a running, the blockchain data structure and its cached states are loaded from the persistent storage by the PDB module 176.

The NDN transport (NDNTrans) module 180, as an NDN-based transport layer, executes transmission and reception of NDN packets, NDN packet configuration, and NDN prefix announcement to NFD.

The controller 190 may perform as an information hub for other modules.

The controller 190 receives transport messages from the NDN transport module 180 and forwards the transport messages to be handled by other modules including the TxFetcher module 160, the BlkFetcher module 150 and the chain synchronizer module 162.

The controller 190 provides interfaces for fetching blockchain data such as transaction, block headers, block bodies, which are used by the TxFetcher module 160, the BlkFetcher module 150 and the chain synchronizer module 162.

The controller 190 executes the logic for peer managements and manipulates the peer list through the interface provided by the peer manager module 140.

Hereinafter, NDN naming and transport for data will be described.

All messages or data objects should be named in NDN. Application names may be separated from network names. An application name is a location-independent name, and a network name is a location-dependent name to uniquely identify the host which is used to forward the NDN Interest packet correctly to the host. Therefore, it is assumed that the network name should be known by any means a priori before sending an NDN Interest packet.

Figure 2:
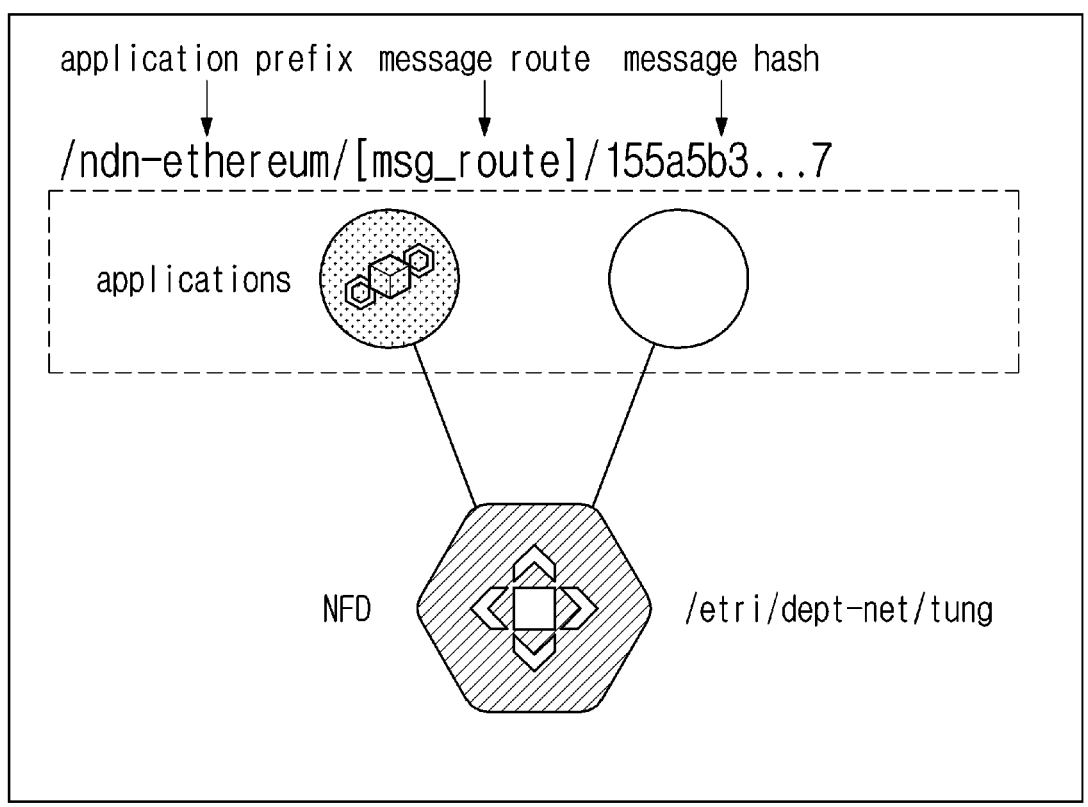
FIG. 2 is a view illustrating an example of allocating a name to an NDN packet according to an embodiment of the present disclosure.

FIG. 2 is a view illustrating an example of allocating a name to an NDN packet according to an embodiment of the present disclosure.

Referring to FIG. 2, an application, ndn-ethereum client, is running on a host owned by Tung in the department of network research of ETRI. The host is named a globally routable name (e.g., /etn/dept-net/tung). The name of each data object in the application starts an application name prefix (e.g., /ndn-ethereum), followed by a message route and a message. Herein, the message route indicates various message types such as remote procedure call (RPC), transaction and block announcement (txannounce), status, and data (transaction and blocks).

Figure 3A:
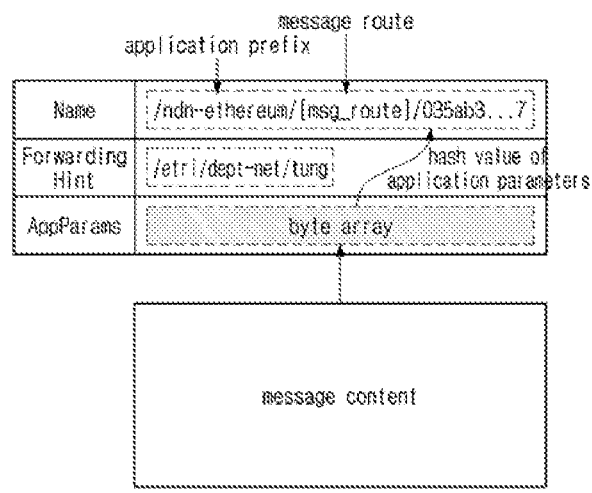
FIGS. 3A-3B are views illustrating an NDN Interest packet and a format of a Data packet according to an embodiment of the present embodiment.
Figure 3B:
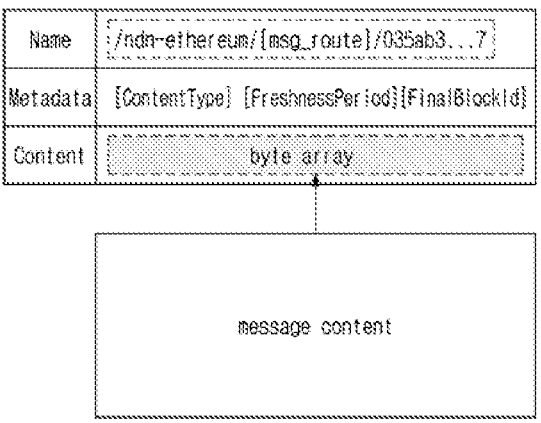

FIGS. 3A-3B are views illustrating an NDN Interest packet and a format of a Data packet according to an embodiment of the present embodiment.

FIG. 3A is a view illustrating an Interest packet. FIG. 3B is a view illustrating a Data packet.

Referring to FIG. 3A, in the case of an NDN Interest packet, the message content is first binary encoded in a byte array into the AppParams element. The hash value of the byte array also becomes a part of its name. Since the NDN name for the message is not globally routable, the packet is routed to the destination through ForwardingHint of the Interest packet.

The ForwardingHint is the globally routable name of the host, which is running the application capable of receiving and processing the message.

Referring to FIG. 3B, in the case of an NDN Data packet, the message content is binary encoded in a byte array into the Content element.

Figure 4:
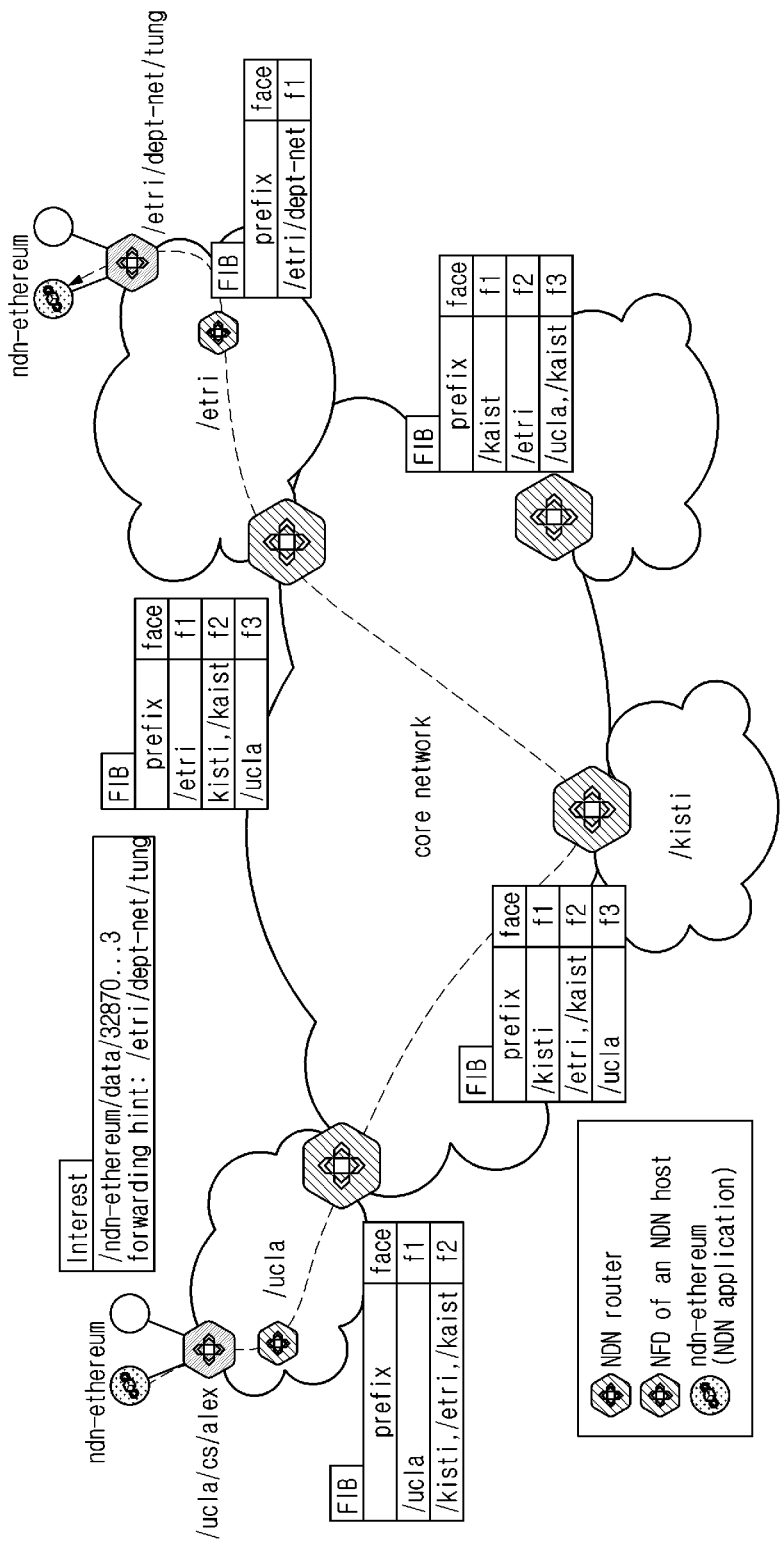
FIG. 4 is a view illustrating an example of searching for a location-independent data object according to an embodiment of the present disclosure.

FIG. 4 is a view illustrating an example of searching for a location-independent data object according to an embodiment of the present disclosure.

Referring to FIG. 4, a peer (tung), which is located at a sub-network domain (dept-net) in the globally reachable network domain (etri), is given a name prefix, /etri/dept-net/. Suppose that tung announces a data object whose hash value is 0x32870 . . . 3 to peers and thus a peer (alex) who is located at a different domain (e.g., /ucla) knows the information.

The peer (alex) in the domain (/ucla) sends an Interest packet with the name/ndn-ethereum/data/32870 . . . 3 to the network. The packet has a routable name prefix of the producer of a corresponding data object in ForwardingHints. /etri/dept-net/tung is the routable name prefix in this case. Since a name prefix starts with a domain name and the domain name of a data object producer is globally announced to every NDN node (NFD) on the core network, the Interest packet eventually arrives at the producer through the gateway NDN node (NFD) of the producer's domain network.

Subsequently, other peers located at other domains/kisti and/kaist may also request the same data. The request from the peer of/kisti domain is aggregated at the gateway router of its domain, while the request from the peer of/kaist domain is aggregated at the gateway router of the/etri domain. The returning Data packet is sent back in these forwarding paths supporting multicasting and in-network caching.

Hereinafter, peer discovery will be described.

Any P2P overlay network may be used for blockchain networks. Ethereum uses Kademlia Distributed Hash Table (DHT) to create a P2P network.

Kademlia may be used in an embodiment of the present invention. The Kademlia algorithm itself does not change even on NDN transport network. However, the RPC primitives should be built over an NDN network. This may be done with an Interest/Data communication model, and the client may embed its request for RPC call in an Interest and forwards a server response to the RPC call to a corresponding Data packet.

In an embodiment of the present invention, each blockchain client may have a globally unique 'node identity' over a P2P overlay network that is created among the blockchain clients. The 'node identity' may be a fixed-length random bit string. More specifically, each blockchain client may possess a pair of public-private cryptographic keys. The 'node identity' may use the hash (e.g., SHA1) value of a binary concatenation of the public key and other information such as peer transport address.

In an embodiment of the present invention, an NDN name is assigned to each P2P message that is used for forwarding through an NDN transport network. The NDN name may or may not be globally routable to a target P2P client. Otherwise, another globally routable name may be used as ForwardingHint to the target. In case there is a ForwardingHint in an Interest packet, the packet is forwarded according to the forwarding information for the Forwarding Hint.

In an embodiment, the RPC (remote procedure call) may be implemented with Interest and Data packets according to FIGS. 3A-3B. The RPC commands (Ping, FindNode) and their parameters may be binary coded in the ApplicationParameters element of the Interest packet. The response data of the RPC command may be binary coded in the Content part of the returning Data. As for the naming of Interest packet for an RPC command, the hash value of the application parameters may be added at the end of the Interest name.

Figure 5A:
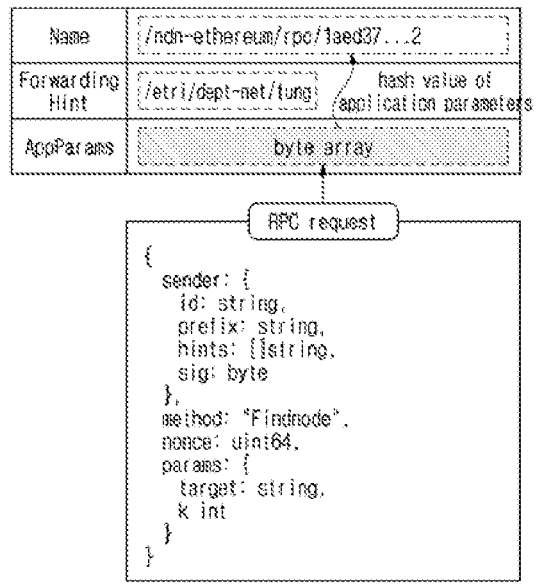
FIGS. 5A-5B are views showing an example of RPC message according to an embodiment of the present disclosure.
Figure 5B:
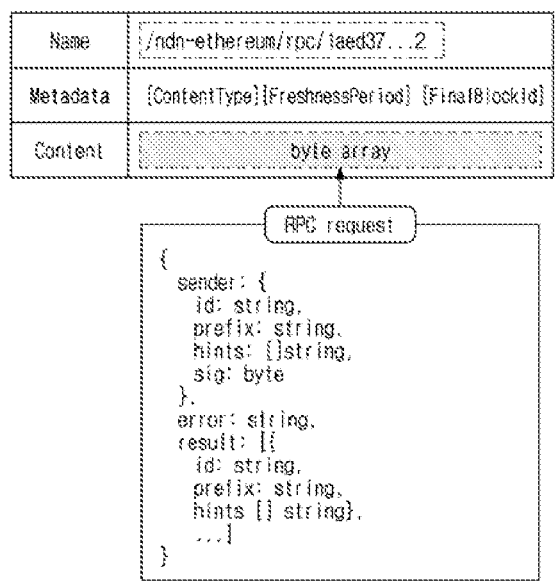

FIGS. 5A-5B are views showing an example of RPC message according to an embodiment of the present disclosure.

FIG. 5A is a view illustrating an Interest packet. FIG. 5B is a view illustrating a Data packet.

Referring to FIG. 5A, an RPC request message includes a sender's node record, the names of a command of the request and a parameter, and a random nonce value. The nonce value is included to guarantee the uniqueness of the NDN name of the request so that a response to the request is always fresh (no caching).

Referring to FIG. 5B, a response message includes a node record of a sender of the response, an error value indicating the execution status of the request command, and an execution result. The nonce value is not needed in the response message as it is implicitly encoded in the Data packet name.

Hereinafter, peer management will be described.

Before exchanging any blockchain data with another peer, a node may have to accept the peer as a trusted partner. A client manages a list of trusted peers for data announcements and retrieval. This list is different from the routing table maintained by the P2P discovery module and is a subset of the routing table entries. The two peers send each other a pair of status message to know whether they may become trusted partners and to learn of their blockchain status. A message includes information like a node record, a local blockchain status of a node including hash of a genesis block, hash and block number of a last block, and the current total difficulty of a chain.

Figure 6A:
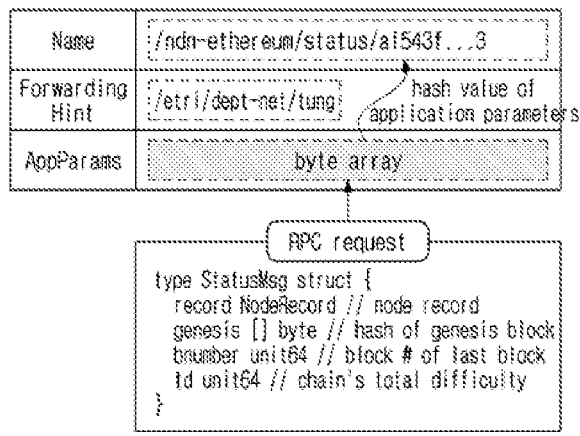
FIGS. 6A-6B are views illustrating encapsulation of a status message in an NDN packet according to an embodiment of the present disclosure.
Figure 6B:
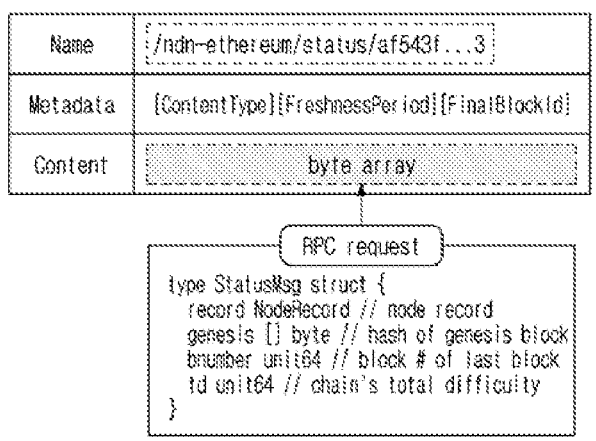

FIGS. 6A-6B are views illustrating encapsulation of a status message in an NDN packet according to an embodiment of the present disclosure.

FIG. 6A is a view illustrating an Interest packet. FIG. 6B is a view illustrating a Data packet.

Referring to FIG. 6A, when a node wants to notify its chain status to a peer, the node embeds a status message (StatusMsg) in an NDN Interest packet and sends the packet to the peer. When receiving the packet, the peer may also want to notify the sending peer of its chain status.

Referring to FIG. 6B, a status message (StatusMsg) is embedded in a replying Data packet and is then sent back.

Hereinafter, transaction and block propagation will be described.

Blockchain is a distributed database, thus data broadcasting is its main communication model. Newly generated data such as transactions or blocks are broadcasted from its origin to all the other nodes. Broadcasting on P2P overlay is necessary for flooding attack prevention, but the mechanism is not efficient as the same Data packet may be transmitted redundantly.

The present invention designs an announce-pull data propagation model that is capable of taking benefit of in-network caching and native multicasting features of the NDN while retaining the prevention of flooding attack feature of the P2P. The model is applicable to generic data objects to be broadcast on a blockchain network.

The main idea of the broadcasting scheme is to announce the availability of the new data objects through P2P overlay while retrieving data using the pull method of NDN that takes full benefits of its advantages. Objects have globally unique names that are location independent.

Figure 7:
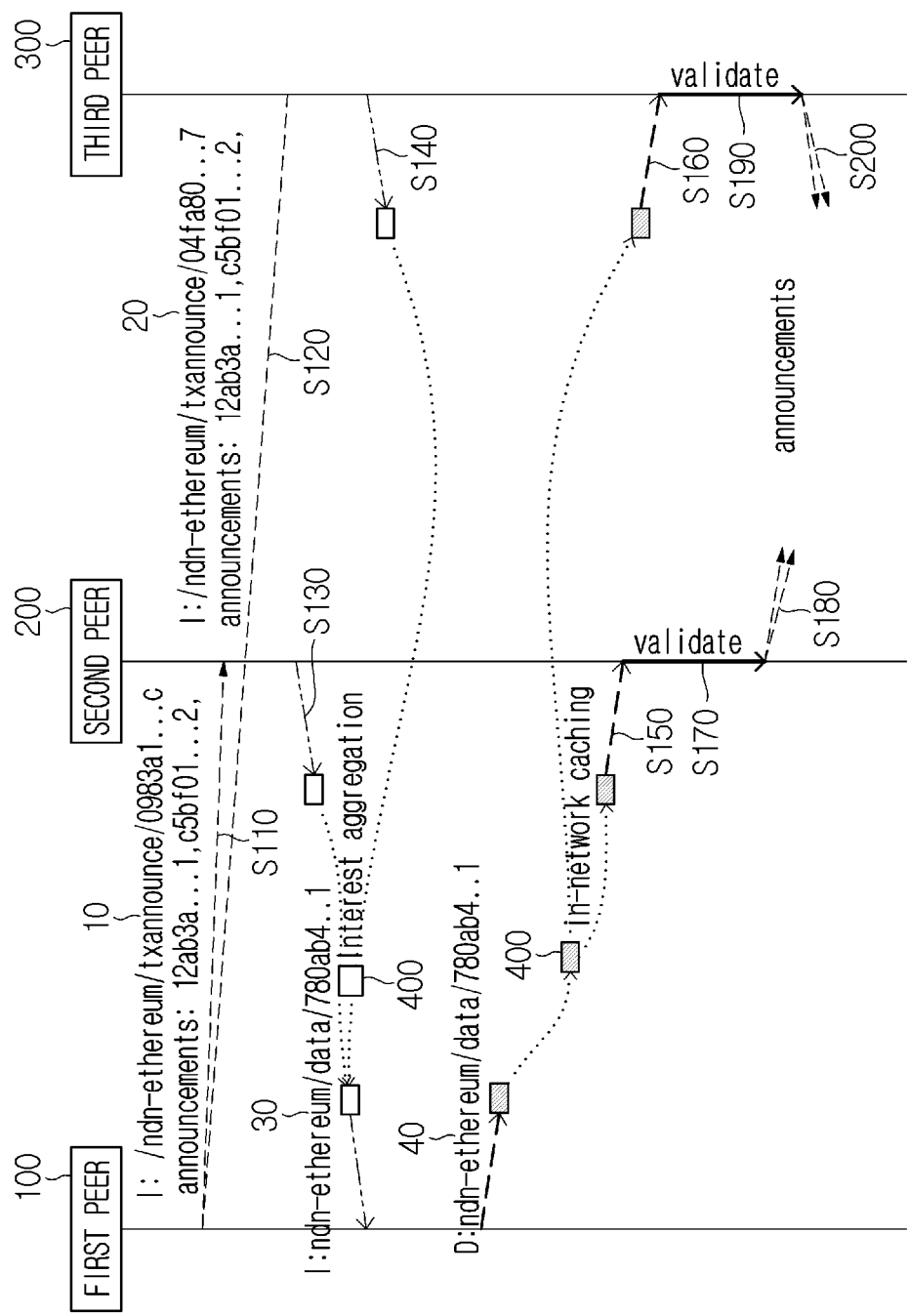
FIG. 7 is a view illustrating an announce-pull data broadcasting scheme according to an embodiment of the present disclosure.

FIG. 7 is a view illustrating an announce-pull data broadcasting scheme according to an embodiment of the present disclosure.

Referring to FIG. 7, a first peer 100 transmits a first Interest packet enclosing an announcement message 10, which carry a hint of embedding first data, to a second peer 200 (S110).

The first peer 100 transmits, to a third peer 300, a second Interest packet, which has the same content as the first Interest packet but a different name, enclosing the announcement message 20 (S120). Herein, the announcement message includes at least one of a transaction announcement message or a block announcement message.

The first peer 100 receives a third Interest packet 30 requesting the first data from the second peer 200 (S130).

The first peer 100 receives a fourth Interest packet requesting the first data from the third peer 300 (S140).

The first peer 100 transmits a first Data packet 40 corresponding to the third Interest packet 30 to the second peer 200 (S150).

The first peer 100 transmits the first Data packet corresponding to the fourth Interest packet to the third peer (S160).

Herein, the third Interest packet and the fourth Interest packet are aggregated at a middle node 400.

That is, the middle node 400 may aggregate the third Interest packet and the fourth Interest packet and transmit an aggregate Interest packet of the third Interest packet and the fourth Interest packet to the first peer 100. Herein, the subject of aggregation is the middle node 400.

In addition, the first Data packet 40 is cached at the middle node 400. Herein, caching means one type of information replication that uses information known during a previous transaction to process a subsequent transaction.

That is, the middle node 400 stores the first Data packet 40 and transmits the first Data packet 40 preferentially to the second peer 200. In addition, when necessary later, the cached first Data packet 40 is transmitted to the third peer 300. Herein, the subject of caching is the middle node.

Herein, a peer means a relation between terminals, more specifically, a relation made over a P2P overlay network. Specifically, a peer means a counterpart terminal node that is related to it on a blockchain network. For example, a counterpart terminal node having a relation with a first peer may be a second peer and a third peer. The attribute of a middle node is an NDN node.

Next, when receiving the cached first Data packet 40 from the middle node 400, the second peer 200 validates data integrity of the received first Data packet 40 (S170).

The second peer 200 validates data integrity based on a hash value included in the NDN name and a hash value of the received first Data packet.

The block fetcher module 150 and the transaction fetcher module 160 of the second peer 200 validate data integrity. When the hash value included in the NDN name and the hash value of the received first Data packet are the same, the second peer 200 determines that data integrity is validated. When the hash value included in the NDN name and the hash value of the received first Data packet are not the same, the second peer 200 determines that data integrity fails.

The second peer 200 announces the validated first Data packet to another peer (S180).

When receiving the cached first Data packet 40 from the middle node 400, the third peer 300 validates data integrity of the first Data packet 40 (S190).

The third peer 300 announces the validated first Data packet to another peer (S200).

Hereinafter, announcement will be described.

When a peer wants to broadcast a data object (or a list of them), the peer sends an announcement embedded in an Interest packet to its peers. The announcement contains the hash value of the data object which is available as ID of the data. As the announcement is forwarded to each peer, a unique name needs to be designated. However, the content is the same.

Figure 8:
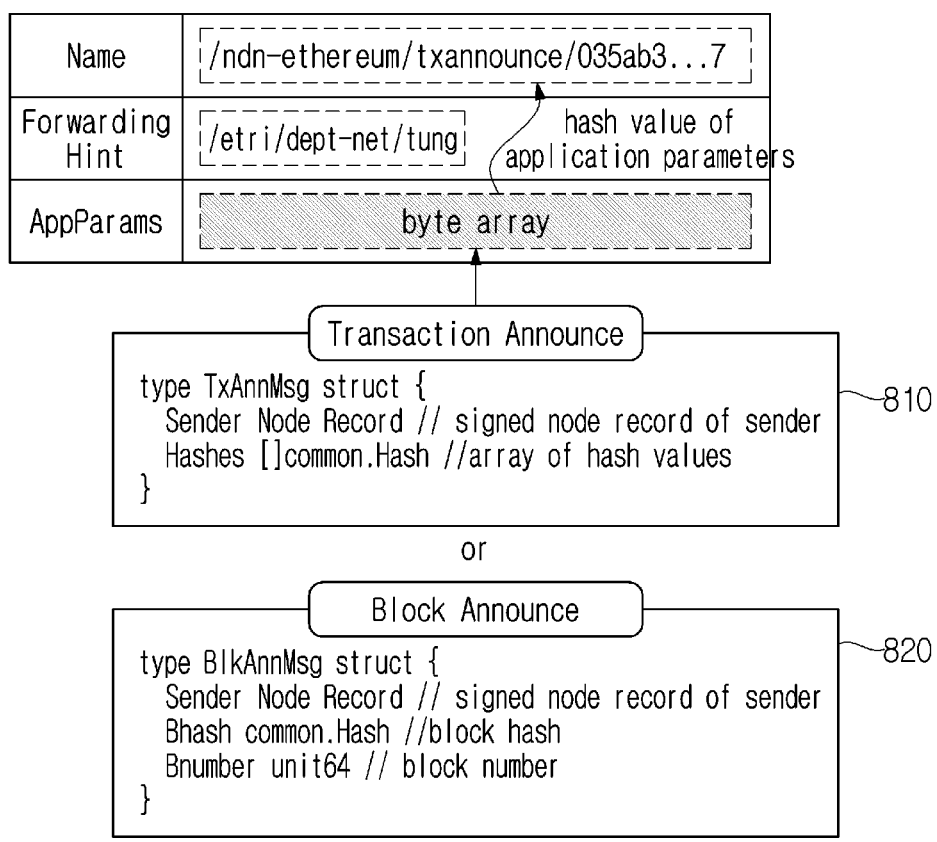
FIG. 8 is a view illustrating an example of announcement message according to an embodiment of the present disclosure.

FIG. 8 is a view illustrating an example of announcement message according to an embodiment of the present disclosure.

Referring to FIG. 8, there are two types of announcement messages: transaction announcement message 810 and block announcement message 820.

Hereinafter, the transaction announcement message 810 will be described.

This message is sent from a client node to announce its peers of new pending transactions in its transaction pool. After accepting a new peer, the node sends this message to notify the peer of its pending transactions. The message contains a list of transaction hashes. The number of hash values should be so limited as not to be greater than an allowable size of NDN packet. When the number of pending transactions is greater than a maximum size of packet, the announcement may be spliced into several announcement messages. The sender information is the node record of the announcement sender. The receiver should validate the node record for authentication.

```
type TxAnnMsg struct {
    Sender NodeRecord // signed node record of sender
    Hashes [ ]common.Hash //array of hash values
}
```

Next, the block announcement message 820 will be described.

This message is sent from a client node to announce its peer of the new mined block.

The message includes the hash of the new block and its block number. Similar to the transaction announcement message, the node record of the sender should be included for authentication.

```
type BlkAnnMsg struct {
    Sender NodeRecord // signed node record of sender
    Bhashes common.Hash //block hash
    Bnumber unit64 //block number
}
```

Next, data pull will be described.

A peer receiving an announcement fetches data from a peer sending the announcement by Interest/Data pulling mechanism. For each announced data hash, an Interest packet with a globally unique name is formed and sent to the peer sending the announcement. The announced hash of each data may be used directly as a part of Interest name or other indirect mechanisms may be used to derive a name from the hash. Since the Interest packets requesting the same data are identical, multiple Interest packets, which are forwarded to a peer sending the announcement, may be aggregated at a middle node. In addition, a Data packet, which is returned for Interest, may be cached at each node for subsequent retrievals.

When a peer successfully receives data, the peer should check data integrity by comparing a hash value embedded in an NDN name and a hash calculation for the forwarded data.

The peer announces the data to its peers only when the data is valid. Therefore, invalid Data packets are blocked at honest peers which prevent flooding attacks.

Figure 9A:
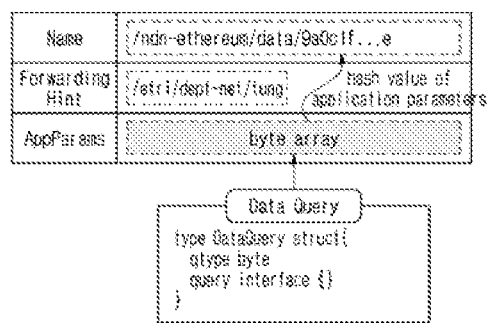
FIGS. 9A-9B are views illustrating a data request and a corresponding response message according to an embodiment of the present disclosure.
Figure 9B:
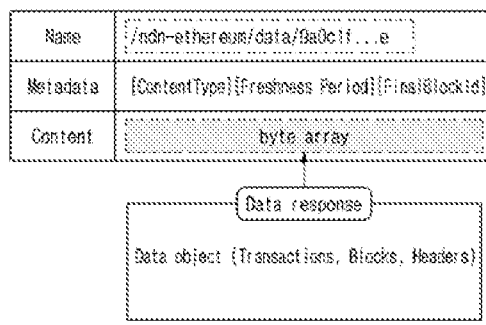

FIGS. 9A-9B are views illustrating a data request and a corresponding response message according to an embodiment of the present disclosure.

FIG. 9A is a view illustrating an Interest packet. FIG. 9B is a view illustrating a Data packet.

Hereinafter, the data request will be described.

Referring to FIG. 9A, there are three types of data request messages: transaction request message, block request message, and block headers request message. Each type of request messages is wrapped by a generic request message. In addition, the generic message is embedded within an NDN Interest packet. By this wrapping scheme, only a single prefix is available which serves all kinds of request messages, thereby simplifying implementation.

A message has two elements. qtype specifies an inner query type. query is a generic pointer to requested data that are different according to request types.

```
type DataQuery struct {
    qtype byte
    query interface{ }
}
```

Hereinafter, the transaction request message will be described.

The message is sent to request for a pending transaction. The message includes the hash of transaction. This is known in advance in a received announcement.

```
type TxQuery struct {
    Thash common.Hash // Transaction hash value
}
```

Hereinafter, the block request message will be described.

The message is sent to request a block, a header or a body. The message includes the hash of the block and the block number, both are known by the requesting peer in advance. For example, the information is known through a block announcement message.

```
type BlockQuery struct {
    Bhash common.Hash //256-bit
    Bnum uint64
    Part byte // flag: whole block/header/body
}
```

Hereinafter, the block headers request message will be described.

The message is sent to request a batch of headers of a canonical chain to a peer during a chain synchronization procedure. The message includes the index of a first block, the number of headers to retrieve, and a skip parameter which defines the number of headers to skip between two consecutive retrieving headers.

```
type HeadersQuery struct {
    From uint64
    Count uint64
    Skip uint64
}
```

Hereinafter, the data response will be described.

Referring to FIG. 9B, a queried data object is forwarded through a response message for a request query. Specifically, a transaction is a response message for a transaction request. A list of headers is a response message for a headers request. A block header or a body is a response message for a block request. The response messages are binary encoded before being encapsulated within an NDN Data packet.

Figure 10:
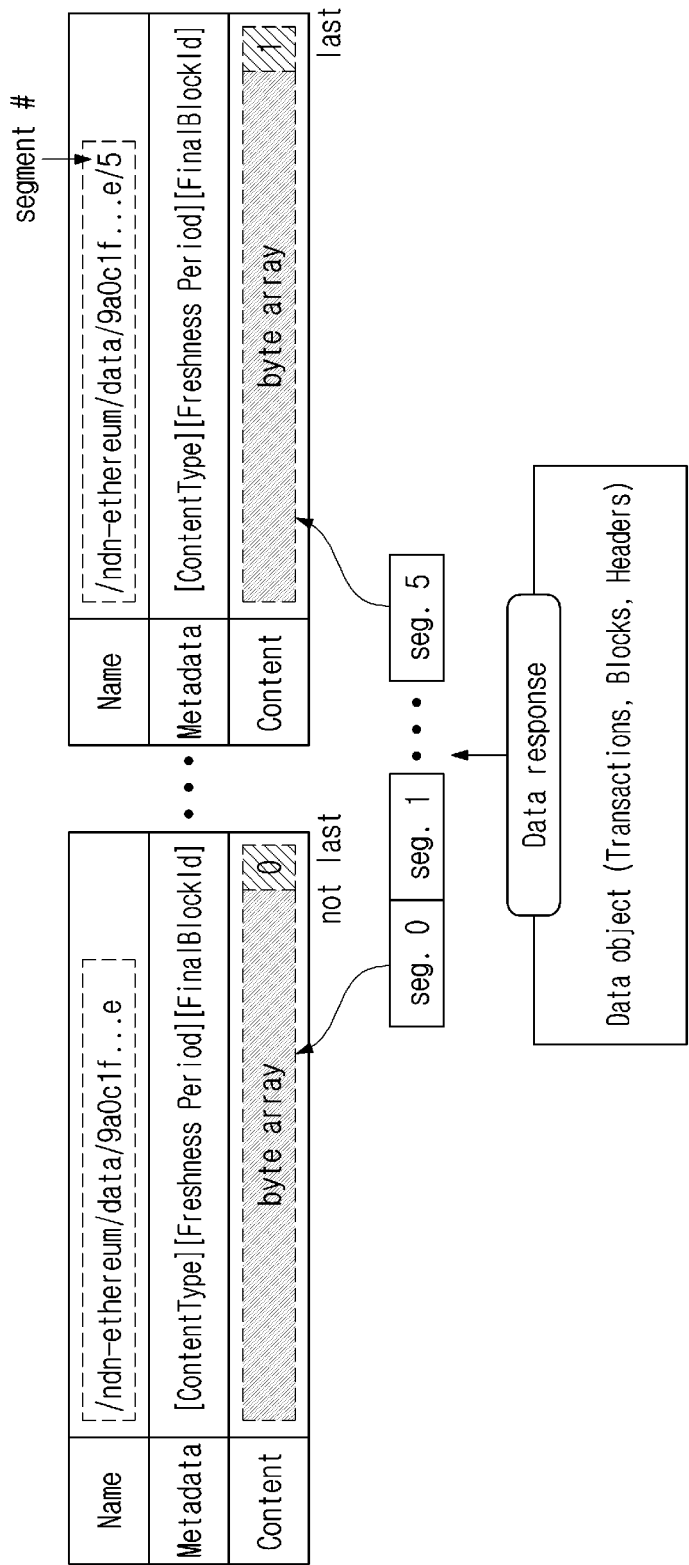
FIG. 10 is a view illustrating an example of response message of segmented data according to an embodiment of the present disclosure.

FIG. 10 is a view illustrating an example of response message of segmented data according to an embodiment of the present disclosure.

Referring to FIG. 10, in case a single NDN Data packet has no enough space for a requested data object, the object binary is partitioned into pieces and each of the pieces is small enough for siting within the single Data packet. The segments are numbered monotonously. A segment number becomes a part of a corresponding Interest packet name. For each segment, an extra byte is added to the end as a Boolean flag indicating whether or not the segment is the final one. The segment with the Boolean flag is included in a content field of an NDN Data packet. The name of the Data packet should be identical to the name of a corresponding Interest packet.

Regardless of the object segmentation, the name of a first Interest packet does not have a segment number. The first segment implicitly assumes zero. After receiving a segment, a requester checks a Boolean flag, which is the last byte, to learn whether or not to retrieve more segments. When the Boolean flag indicates that there are more segments, the requester sends a next request by increasing the segment number one step further. The procedure is repeated until the final segment is received. After the final segment is received, a complete binary object is reconstructed by concatenating all the segments.

Hereinafter, service flow will be described.

A main flow of information processing in a client program will be described according to an embodiment of the present invention. Only the main flow is shown, and a further detailed flow may exist based on the main flow.

Hereinafter, peer discovery and management will be described.

Whenever a peer is added to the Kademlia routing table, the P2P discovery module sends an event to the controller module to announce a newly available peer. The controller checks whether or not to add any more peer to the managed peer list. In case there is any available slot, the controller performs a message handshake with a remote peer in order to add a partner to its managed peer list.

Figure 11:
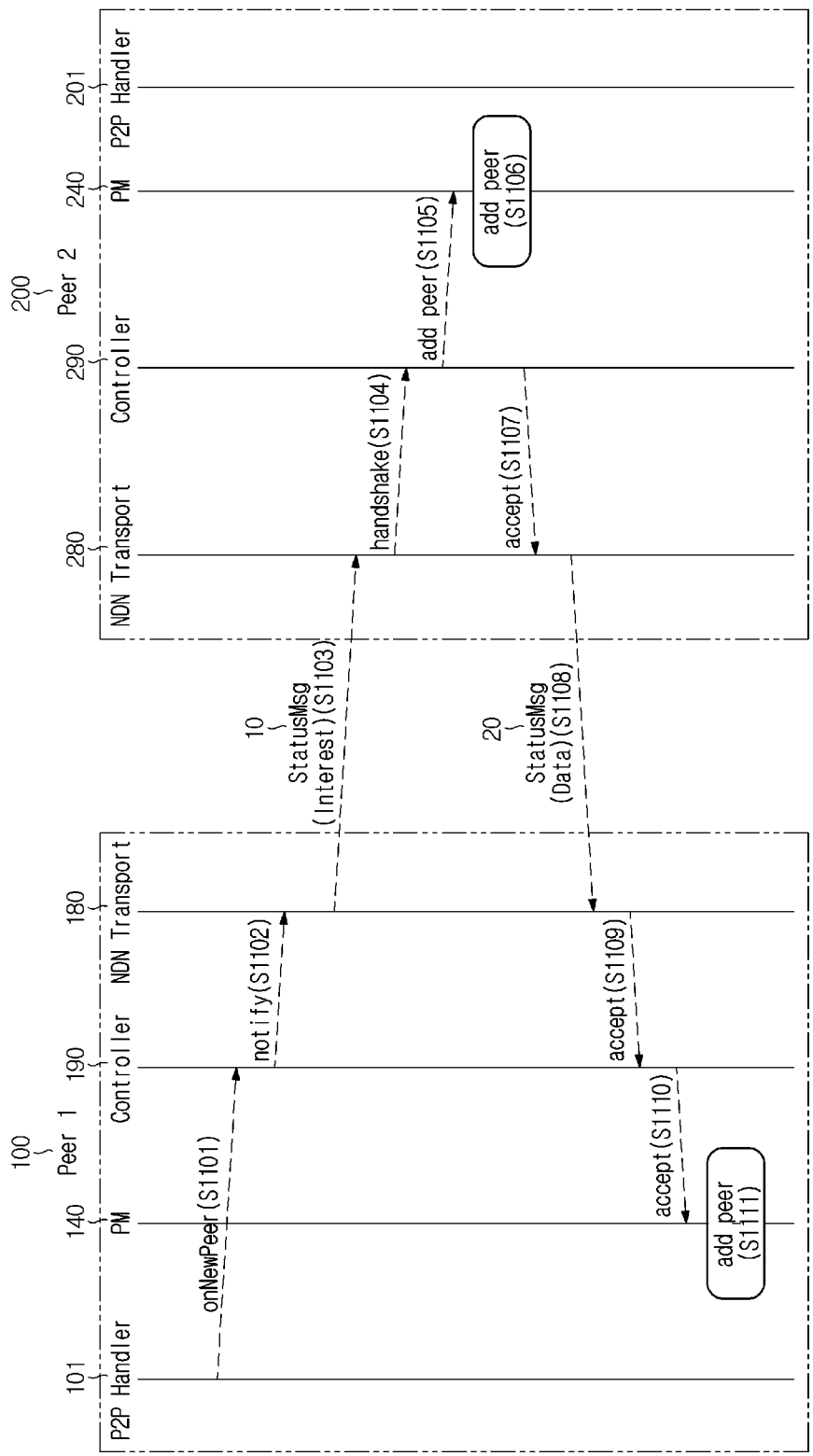
FIG. 11 is a view illustrating a peer management process according to an embodiment of the present disclosure.

FIG. 11 is a view illustrating a peer management process according to an embodiment of the present disclosure.

Referring to FIG. 11, when the second peer 200, which is a remote peer, is added to a routing table of the P2P discovery module 165, a P2P handler 101 of the first peer 100 notifies the controller 190 of the event (S1101).

The controller 190 has a maximum number of acceptable peers, which is set by the configuration module at the beginning of client execution. The controller 190 checks whether or not a new peer may be added to a peer list and, when the new peer may be added, requests the NDNTrans module 180 to send a message notifying a blockchain status to the second peer 200 (S1102).

The NDNTrans module 180 sends a status message 10 to the second peer 200 (S1103).

The NDNTrans module 280 of the second peer 200 receives the status message 10 and notifies the controller 290 to process the status message 10 (S1104).

The controller 290 of the second peer 200 checks the validity of the received status message 10 and a record of the first peer 100, which is the message sender. In case the first peer 100 is acceptable, the controller 290 requests the peer manager module 240 of the second peer 200 to add the first peer 100 to a managed peer list (S1105).

The peer manager module 240 of the second peer 200 adds the first peer 100 to the peer list (S1106).

The controller 290 of the second peer 200 requests the NDNTrans module 280 of the second peer 200 to send a message notifying a blockchain status to the first peer 100 (S1107).

The NDNTrans module 280 of the second peer 200 sends the status message 20 to the first peer 100 (S1108).

The NDNTrans module 180 of the first peer 100 receives the status message 20 and forwards the status message 20 to the controller 190 of the first peer 100 (S1109).

The controller 190 of the first peer 100 checks the message and record of the second peer 200 and requests the peer manager module 140 of the first peer 100 to add the second peer 200 (S1110).

The peer manager module 140 of the first peer 100 adds the second peer 200 to a list of peers (S1111).

After adding a new peer, peer manager modules of each peer notify a chain synchronizer module of a peer addition event so as to check whether or not a new synchronization round should start.

Hereinafter, transaction propagation will be described.

A client node receives a new transaction in two ways. A user sends the transaction directly and then the transaction is received through the UIB module, or another peer announces the transaction then the transaction is fetched through the controller. When the transaction is received, the client checks the validation of the transaction based on its local blockchain status. When the transaction is already included in the chain or is invalid, the transaction is discarded. Otherwise, the transaction is forwarded to another peer in the client's peer list. In addition, when the client runs mining, the transaction is sent to the miner module 130 for including in a block to be mined.

Figure 12:
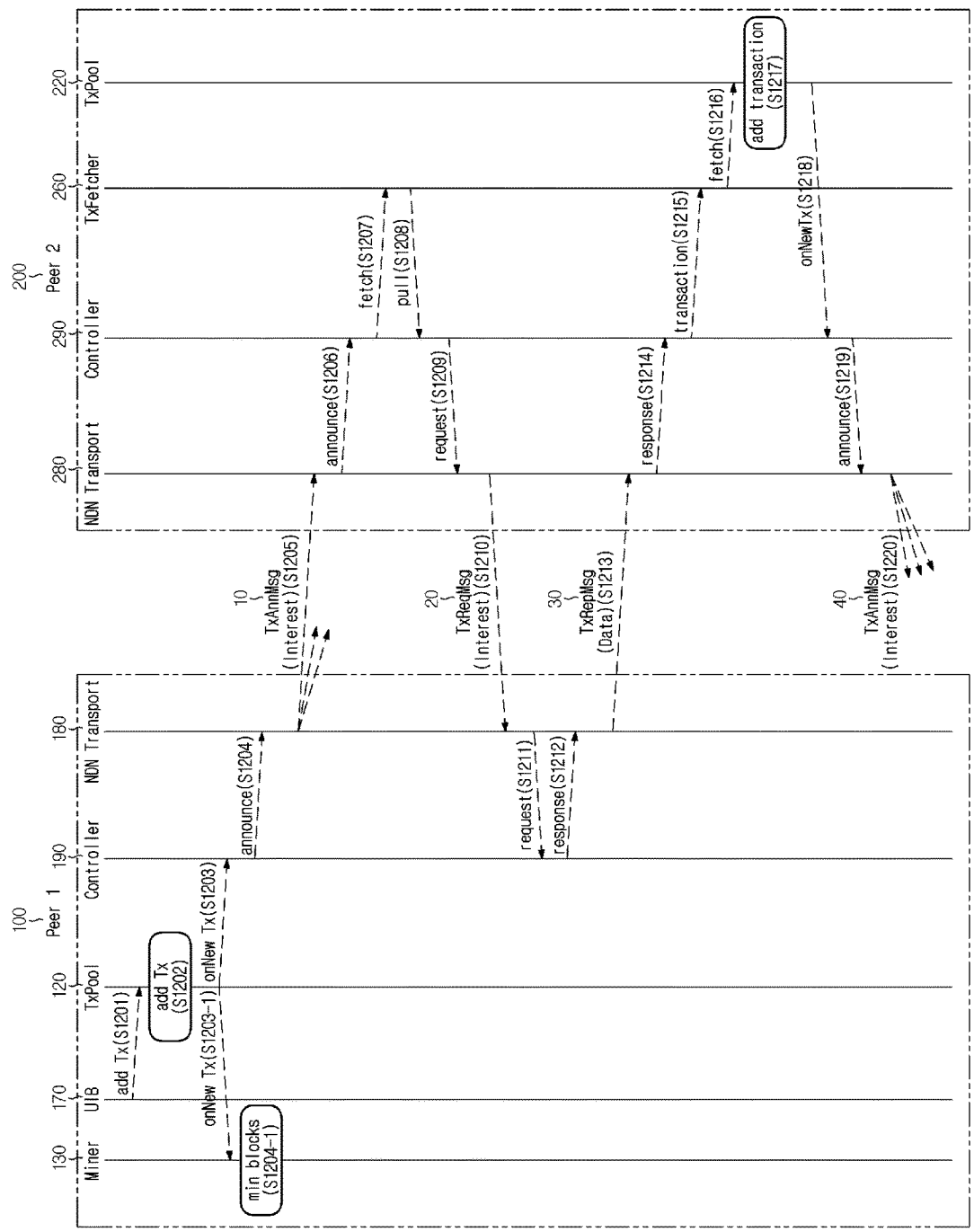
FIG. 12 is a view illustrating a transaction processing process according to an embodiment of the present disclosure.

FIG. 12 is a view illustrating a transaction processing process according to an embodiment of the present disclosure. The present invention is implemented by a transaction processing device (herein not illustrated).

Referring to FIG. 12, in the first peer 100, the user interface backend (UIB) module 170 forwards a transaction to the TxPool module 120 (S1201).

The TxPool module 120 adds the transaction to a current list of pending transactions (S1202).

The TxPool module 120 notifies the controller 190 of newly added pending transactions (S1203).

Whenever a new transaction is added, the TxPool module 120 notifies the miner module 130 of the transaction (S1203-1). When a peer is executed in a mining mode, the TxPool module 120 notifies the miner module 130 of the transaction.

The miner module 130 stops a current mining work, adds a newly added transaction and then starts a mining work of a new block (S1204-1).

The controller 190 requests the NDNTrans module 180 to send a transaction announcement to the second peer 200 (S1204).

The NDNTrans module 180 sends the transaction announcement message 10 to all of its peers (S1205).

When receiving the transaction announcement message 10 from the first peer 100, the second peer 200 forwards the transaction announcement message 10 to the controller 290 (S1206).

The controller 290 forwards, to the TxFetcher module 260, a command to fetch a transaction corresponding to the transaction announcement message 10 from the first peer 100 (S1207).

Specifically, the controller 290 checks the message and record of the first peer 100 which sends the transaction announcement message 10.

When the transaction announcement message is normal, the controller 190 sends a response for the announcement of the first peer 100 to the first peer 100 through the NDNTrans module 180. Herein, the controller 190 may send the response for the announcement of the first peer 100 to the first peer 100 through a dummy Data packet (no content). The controller 290 may not reply.

The controller 290 extracts each list of hash values from the transaction announcement message 10 and forwards, to the TxFetcher module 260, a command to fetch a corresponding transaction from the first peer 100 (S1207).

The TxFetcher module 260 forwards a transaction request signal to the controller 290 (S1208).

The TxFetcher module 260 may receive multiple announcements from a plurality of peers at the same time. Accordingly, the TxFetcher module 260 maintains and manages a list of hash values for transactions that are forwarded through multiple announcements. The TxFetcher module 260 includes multiple workers for fetching several transactions simultaneously.

A worker continuously fetches a hash value from a list of transaction hash values in order to fetch a transaction and forwards a transaction request signal, which requests the transaction from a corresponding peer, to the controller 290 (S1208).

The controller 290 forwards the transaction request signal to the NDNTrans module 280 (S1209).

The NDNTrans module 280 sends the transaction request message 20 including the transaction request signal to the first peer 100 (S1210).

The NDNTrans module 180 of the first peer 100 forwards the received transaction request message 20 to the controller 190 (S1211).

The controller 190 of the first peer forwards a transaction corresponding to the transaction request message 20 to the NDNTrans module 180 (S1212).

Specifically, the controller 190 extracts a query from the transaction request message 20 then queries the TxPool module 120 to get the requested transaction. The controller 190 forwards the transaction to the NDNTrans module 180.

The NDNTrans module 180 of the first peer 100 inserts the transaction into an NDN Data packet and sends the transaction announce message 10, which includes the NDN Data packet, to the second peer (S1213).

Herein, the NDNTrans module 180 of the first peer may encapsulate the transaction in the NDN Data packet.

When the NDNTrans module 280 of the second peer 200 receives the transaction response message 30, the NDNTrans module 280 forwards the transaction response message 30 to the controller 280 of the second peer 200 (S1214).

The controller 290 checks the transaction response message, extracts a transaction from the transaction response message 30 and forwards the extracted transaction to the TxFetcher module 260 (S1215).

The TxFetcher module 260 removes the transaction from a fetching list and forwards the transaction to the TxPool module 220 (S1216).

The TxPool module 220 adds the transaction to a pending list (S1217).

Periodically, the TxPool module 220 gathers newly added transactions, then forwards the gathered transactions to the controller 280 (S1218).

After fetching a list of peers from the peer manager module (herein not illustrated), the controller 190 requests each peer in the list to send an announcement through the NDNTrans module 290 (S1219).

The NDNTrans module 290 sends the transaction announcement message 40 to the other peers (S1220).

Hereinafter, block propagation will be described.

A new block is created by a first blockchain node (miner) which finds a PoW solution. The node then broadcasts the block to a peer. The peer validates the block and adds it to a local blockchain. The block is then propagated to other peers in the same manner.

Figure 13:
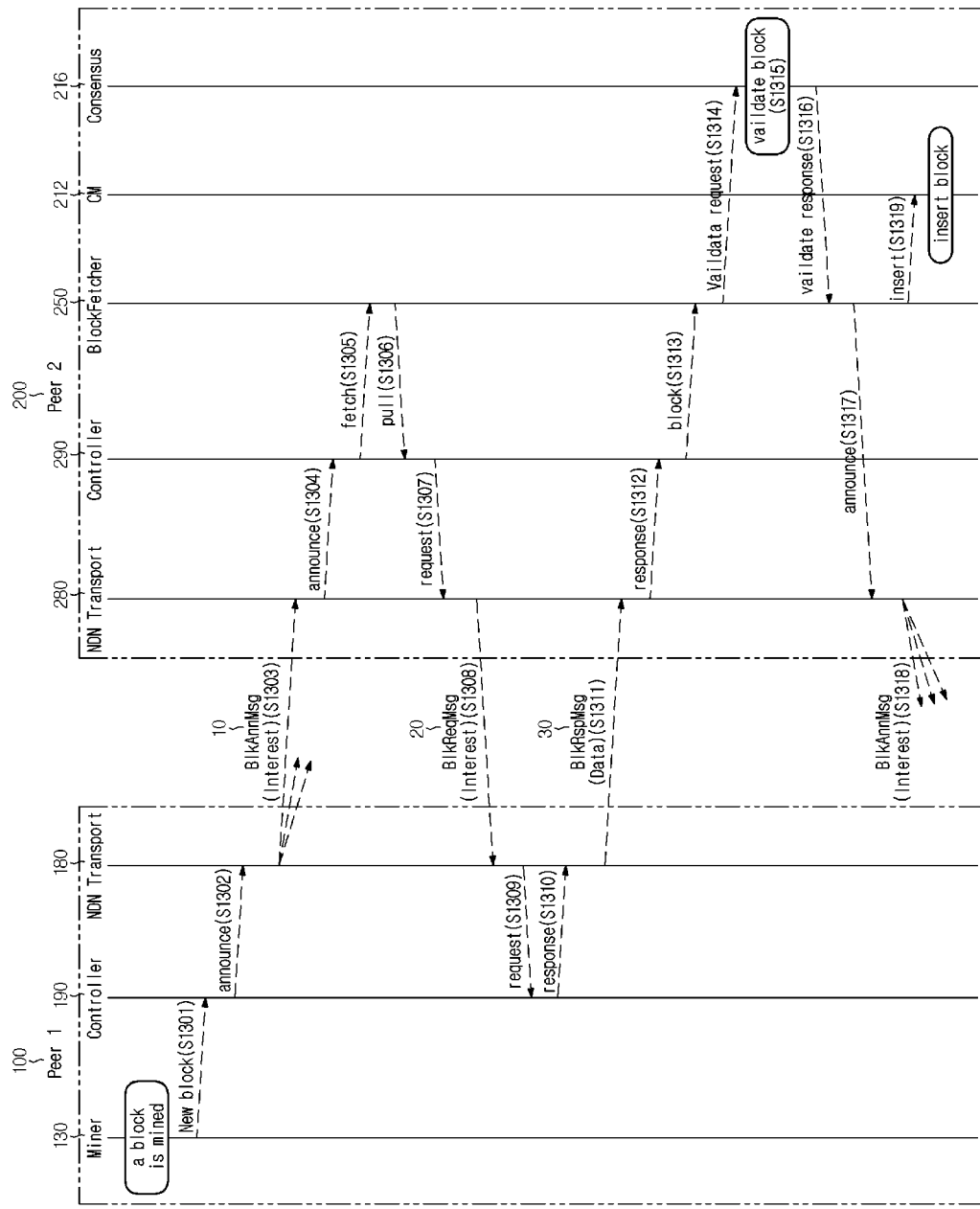
FIG. 13 is a view illustrating a block processing process according to another embodiment of the present disclosure.

FIG. 13 is a view illustrating a block processing process according to another embodiment of the present disclosure. The present invention is implemented by a block processing device (herein not illustrated).

When the miner module 130 finds a PoW solution for a new block, the miner module 130 sends the mined block to the controller 190 (S1301).

The controller 190 requests the NDNTrans module 180 to announce the block to all managed peers (S1302). Herein, the controller 190 may fetch a list of peers from the peer manager module 140 (not shown).

The NDNTrans module 180 sends the block announcement message 10 to every peer in the list including the second peer 200 (S1303).

When the block announcement message 10 is received by the second peer 200, the NDNTrans module 280 forwards the block announcement message 10 to the controller 290 (S1304).

The controller 290 checks the block announcement message 10 and a record of the first peer 100 which sends an announcement.

When the block announcement message 10 is normal, the controller 290 may sends a dummy Data packet as a response for the announcement of the first peer 100 to the first peer 100 through the NDNTrans module 280, or the controller 290 may not reply. The dummy Data packet is a Data packet without any content.

The controller 290 extracts each block number and a hash value of the block from the block announcement message 10 and sends a command to fetch the block from the first peer 100 to the BlkFetcher module 250 (S1305).

The BlkFetcher module 250 sends a block request signal to the controller 290 (S1306).

The BlkFetcher module 250 may receive concurrently multiple block announcements from multiple different peers. Accordingly, the BlkFetcher module 250 maintains and manages a list of block announcements for blocks, which are forwarded through multiple announcements, and the BlkFetcher module 250 maintains multiple workers for fetching multiple blocks concurrently. In order to get a block, a worker continuously fetches block information from the list of block announcements and requests the controller 290 to fetch the block from a corresponding peer (S1306).

The controller 290 requests the NDNTrans module 280 to fetch the block from the first peer 100 (S1307).

The NDNTrans module 280 sends the block request message 20 to the first peer 100 (S1308).

The NDNTrans module 180 of the first peer 100 forwards the received block request message 20 to the controller 190 (S1309).

The controller 190 responds with a block corresponding to the block request message 20 to the NDNTrans module 180 (S1310).

More specifically, the controller 190 checks the block request message 20 and fetches a requested block from the chain manager module 112. The requested block is forwarded to the NDNTrans module 180 (S1310).

The NDNTrans module 180 inserts the block into an NDN Data packet and sends the block response message 30, which includes the NDN Data packet to which the block is inserted, to the second peer 200 (S1311).

The NDNTrans module 280 of the second peer 200 receives the block response message 30 and forwards the received block response message 30 to the controller 290 (S1312). Herein, the block response message 30 includes a block data message.

The controller 290 of the second peer 200 extracts a block from the block response message 30 and forwards the extracted block to the BlkFetcher module 250 (S1313).

The BlkFetcher module 250 requests the consensus module 216 to check the validity of the fetched block (S1314).

The consensus module 216 of the second peer 200 validates the block (S1315). The validation method is the same as the one in FIG. 7, of which the detailed description will be omitted.

The consensus module 216 returns a validation result to the BlkFetcher module 250 (S1316).

The BlkFetcher module 250 requests the NDNTrans module 280 to announce a block to every managed peer via the controller 290 (S1317). Although not shown in the figure, the controller 290 may fetch information on managed peers through the peer manager module.

The NDNTrans module 280 sends the block announcement message 40 to another peer (S1318).

The BlkFetcher module 250 adds a newly fetched block to a local blockchain by periodically requesting block insertion to the chain manager module 212 (S1319).

Hereinafter, chain synchronization will be described.

Whenever each peer determines that its local chain is not synchronized with the blockchain of another peer, it starts a chain synchronization. The detection of the loss of synchronization is performed periodically or at any time a peer status change notification is received. Also, this procedure should be implemented when the peer is first connected or reconnected to the blockchain networks.

Figure 14:
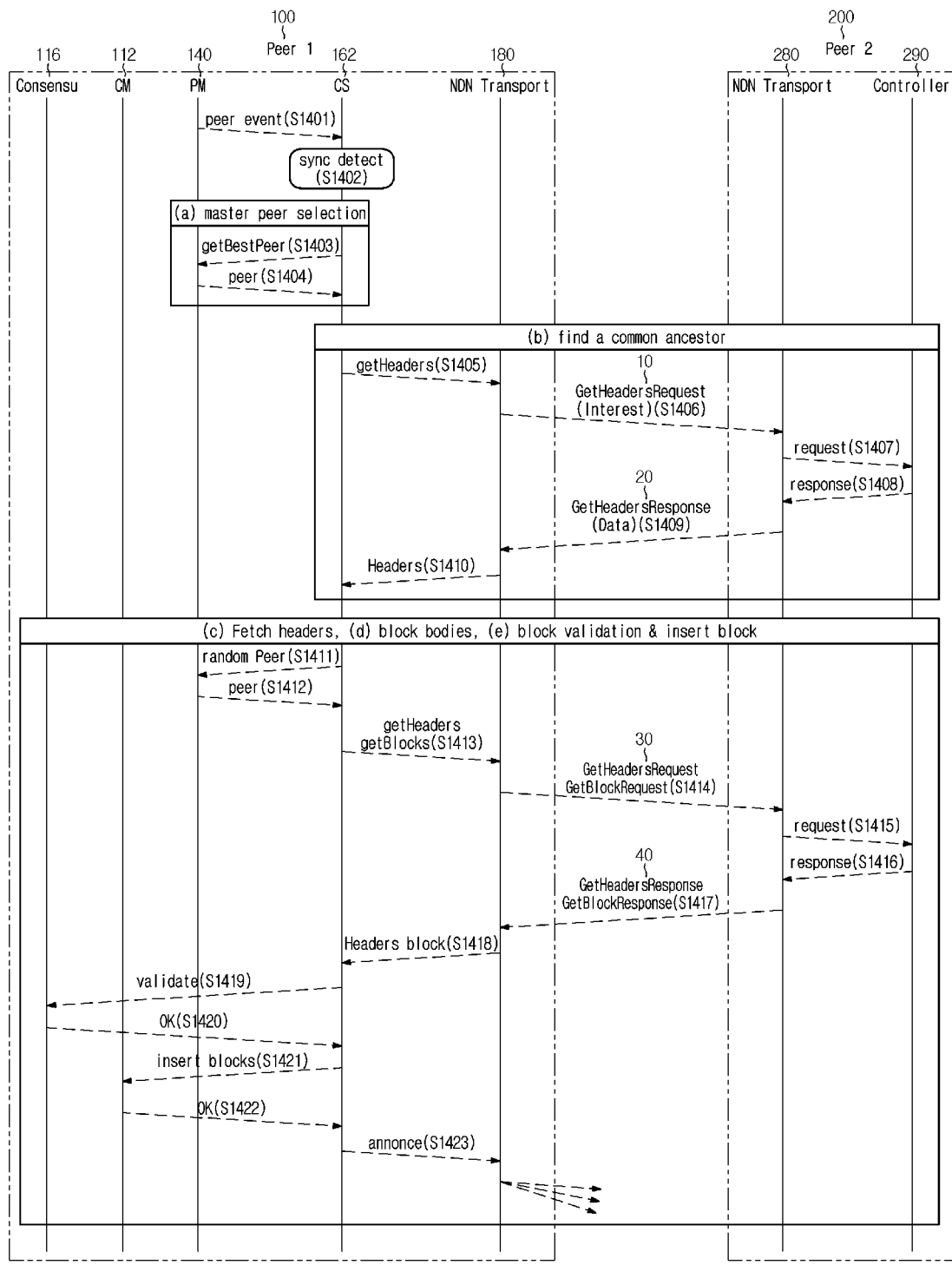
FIG. 14 is a view illustrating a chain synchronization process according to another embodiment of the present disclosure.

FIG. 14 is a view illustrating a chain synchronization process according to another embodiment of the present disclosure. Referring to FIG. 14, generally, the chain synchronization consists of five main steps.

a) a master peer is selected.
b) find a latest matched block between a local chain of a peer and a local chain of the master peer.
c) download all headers from the master peer starting from a mismatched block to the latest block.
d) concurrently download block bodies from all available peers.
e) insert the downloaded blocks to a local chain of the peer. The last three steps are implemented concurrently in three independent interlocking threads.

The chain synchronizer module monitors the chain synchronization status continuously. To this end, the chain synchronizer module performs periodical checking by a fixed period timer and also checks a change a managed peer list of the peer manager module 140. Whenever an event occurs, the chain synchronizer module compares the total difficulty of a client local chain with the difficulty of another peer in order to determine whether or not to start a synchronization round.

The peer manager module 140 fire a peer update event (S1401).

The chain synchronizer module 162 constantly checks for triggering signal of chain synchronization (S1402).

Step (a):

The chain synchronizer module 162 asks the peer manager module 140 to check a master peer which has the largest chain difficulty (S1403). The peer updates and returns the chain difficulty every time the peer broadcasts a new block.

The peer manager module 140 notifies the chain synchronizer module 162 of a peer of which the chain has a largest total difficulty (S1404). The chain synchronizer module 162 sets it as the master peer for chain synchronization.

Step (b):

This step involves multiple rounds of block header requests to the master peer until a common block between the two chains may be found. For comparing blocks, only their headers are needed. Here a binary search may be implemented to find a highest common ancestor block. The remaining steps (c, d, e) are to fetch all blocks starting from the common ancestor.

The chain synchronizer module 162 requests block headers from the master peer (S1405).

The NDNTrans module 180 sends multiple header request messages 10 to the second peer 200 (S1406). Herein, the second peer 200 may become the master peer.

The NDNTrans module 280 of the second peer 200 forwards the header request messages to the controller 290 (S1407).

The controller 290 module fetches the block headers through the chain manager module 212 (not shown in the figure) and forwards the block headers to the NDNTrans module 280 (S1408).

The NDNTrans module 280 encapsulates the block headers in an NDN Data packet and sends the response message for the header request 20, which includes the NDN Data packet, back to the peer requesting the block headers, that is, the first peer 100 (S1409).

The NDNTrans module 180 of the first peer 100 forwards the response message for the header request 20 to the chain synchronizer module 162 so that the requested block headers may be extracted (S1410).

Hereinafter, the steps (c), (d) and (e) will be described.

As mentioned above, the three steps (c), (d) and (e) occur concurrently and thus may be implemented in separated threads. During these steps, the chain synchronizer module 162 asks the NDNTrans module 180 to fetch the block headers and block bodies from other peers. The headers should be downloaded directly from the master peer, while the block bodies may be downloaded from any available peers in a peer list provided by the peer manager module.

For load balancing, the peer manager module 140 may implement a peer selection policy to select a peer. During this period, the NDNTrans module 180 may send multiple header request (HeadersQuery) messages and block request (BlockQuery) messages as requested by the chain synchronizer module 162 (not shown).

The chain synchronizer module 162 of the first peer asks the peer manager module 140 to pick a random peer for fetching a block header or a block body (S1411).

The peer manager module 140 of the first peer 100 selects a random peer from a peer list then returns the peer to the chain synchronizer module 162 (S1412).

The chain synchronizer module 162 of the first peer 100 requests a list of block headers from the master peer. Alternatively, the chain synchronizer module 162 of the first peer 100 requests a block body of a block with a designated number and a designated hash value (S1413)

The NNTrans module 180 of the first peer 100 sends the block header or block body request message 30 to the second peer 200 (S1414).

The NDNTrans module 280 of the second peer 200, which receives the request message 30 for the block header or block body forwards the request message 30 to the controller 290 (S1415).

The controller 290 of the second peer 200 obtains at least one of the requested block header and block body through the chain manager module (not shown in the figure) and then forwards at least one of the block header and the block body to the NDNTrans module 280 (S1416).

The NDNTrans module 280 of the second peer 200 encapsulates at least one of the block header and the block body in an NDN Data packet and sends the second message 40 including the NDN Data packet to the first peer 100 (S1417).

The NDNTrans module 180 of the first peer 100 forwards the second message 40 to the chain synchronizer module 162 which validates and processes messages (S1418).

Whenever a block is assembled from its header and body, the chain synchronizer module 162 requests the consensus module 116 for validating the block (S1419).

The consensus module 116 returns the validation result to the chain synchronizer module 162 (S1420).

The chain synchronizer module 162 asks the chain manager module 112 to add the validated block to a local chain (S1421).

The chain manager module 112 returns the insertion result of the local chain to the chain synchronizer module (S1422).

During the block fetching and block insertion, in case the chain synchronizer module 162 suspects any malicious behavior from a peer, for example, sending of invalid data, the chain synchronizer module 162 may ask the peer manager to drop the peer. The synchronization fails when the master peer is considered as being dead or there is no peer left for data fetching. A peer is dead if it is either unreachable or being suspected of doing malicious acts.

The synchronization is completed as the last block is inserted into the local chain successfully. At the end of synchronization, the chain synchronizer module 162 asks the NDNTrans module 180 to announce the latest block of the local chain to all managed peers. The announcement is for the other peers to learn about a new chain status.

The chain synchronizer module 162 requests the NDNTrans module 180 to announce the block to all managed peers through the controller 162. The chain synchronizer module 162 may fetch a list from the peer manager module 140 (not shown in the figure).

The NDNTrans module 180 sends a block announcement message (S1423).

Figure 15:
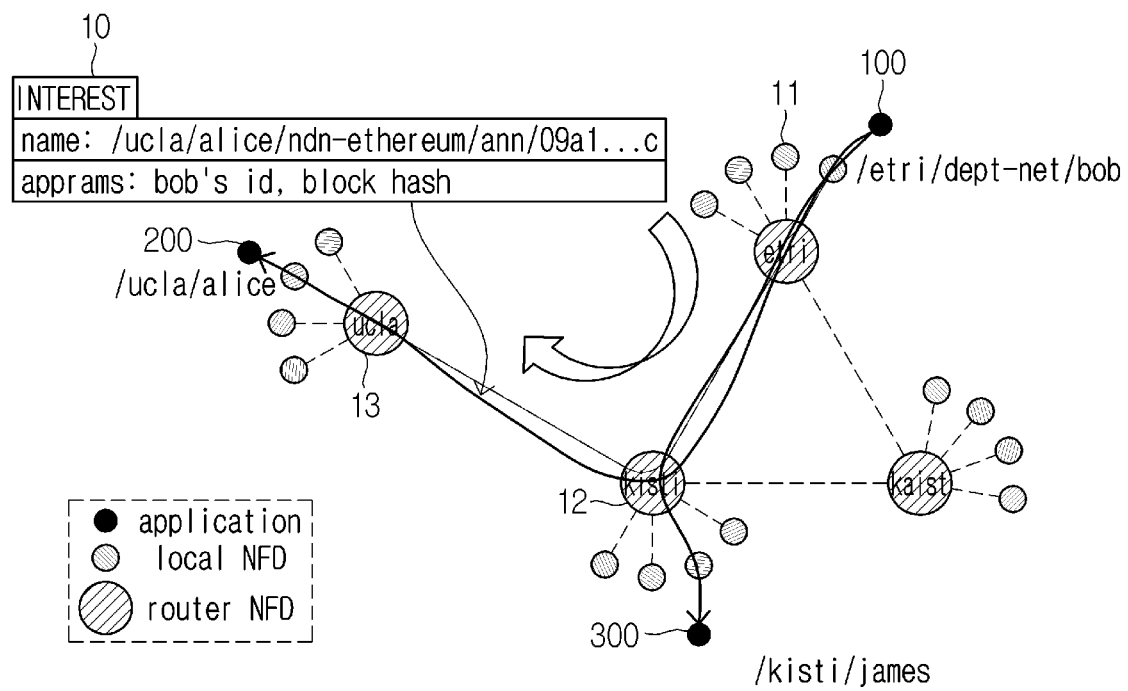
FIG. 15 is a view illustrating an example of transmitting a message in announce-pull data broadcasting according to another embodiment of the present disclosure.

FIG. 15 is a view illustrating an example of transmitting a message in announce-pull data broadcasting according to another embodiment of the present disclosure.

Referring to FIG. 15, the router NFD, which functions as a node, includes etri 11, kisti 12, ucla 13 and kaist 14.

The bob 100 sends Interest packet 10 to alice 200 via etri 11, kisti 12 and then through ucla 13.

Interest packet 10 includes alice's location as its name and a combination of the ID of bob and a block hash as an application parameter value.

In addition, bob may send a similar Interest packet toward james 300 via etri 11 and kisti 12.

That is, through the two Interest packets, bob 100 notifies other neighboring peers, alice 200 and james 300 that bob 100 has data.

Figure 16:
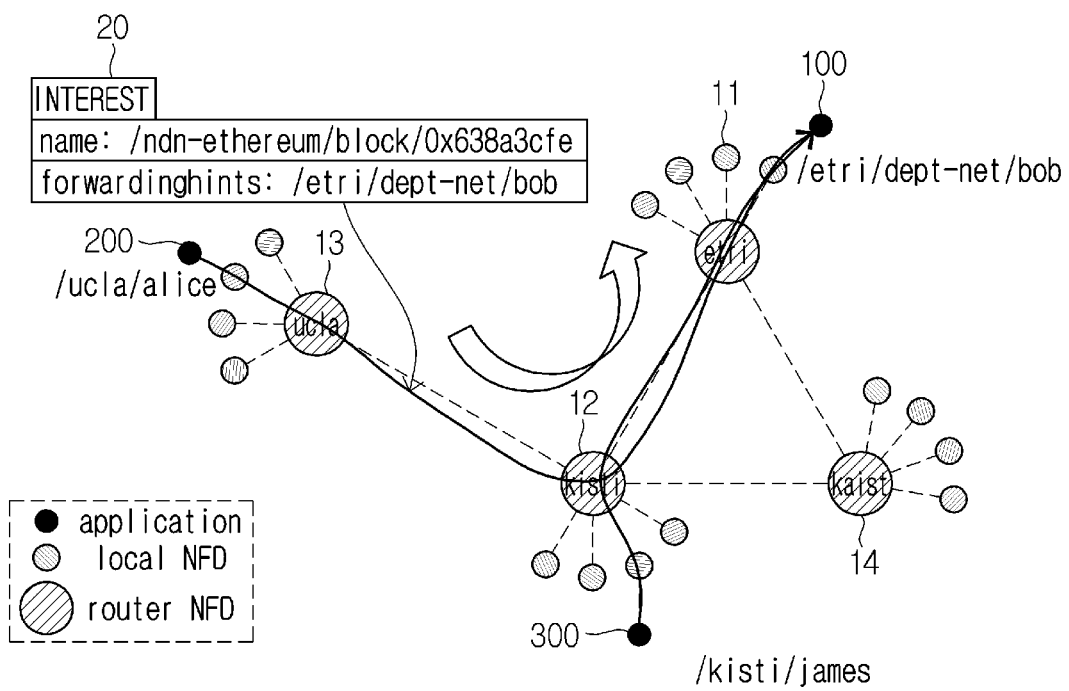
FIG. 16 is a view illustrating an example of requesting data in announce-pull data broadcasting according to another embodiment of the present disclosure.

FIG. 16 is a view illustrating an example of requesting data in announce-pull data broadcasting according to another embodiment of the present disclosure.

Referring to FIG. 16, the router NFD, which functions as a node, includes etri 11, kisti 12, ucla 13 and kaist 14.

The alice 200 sends Interest packet 20 to bob 200 via ucla 13, kisti 12 and then through etri 11.

Interest packet 20 includes a packet name, and a forwarding hint (ForwardingHint). Herein, the packet name includes a "hash" component which is a name specific to data of bob. The packet is forwarded according to information in the forwarding hint. Herein, the forwarding hint means that bob 10 has the data.

That is, alice 200 notifies bob 100 that the alice 200 requests the data of bob 100.

The james 300 sends Interest packet 20 to bob 100 via kisti 12 and then through etri 11.

That is, james 300 notifies bob 100 that the james 300 requests data of bob 100.

Herein, the kisti node 12 may receive a request of alice 200 and a request of james 300, aggregate the requests and notify bob 100 of the aggregated requests.

Figure 17:
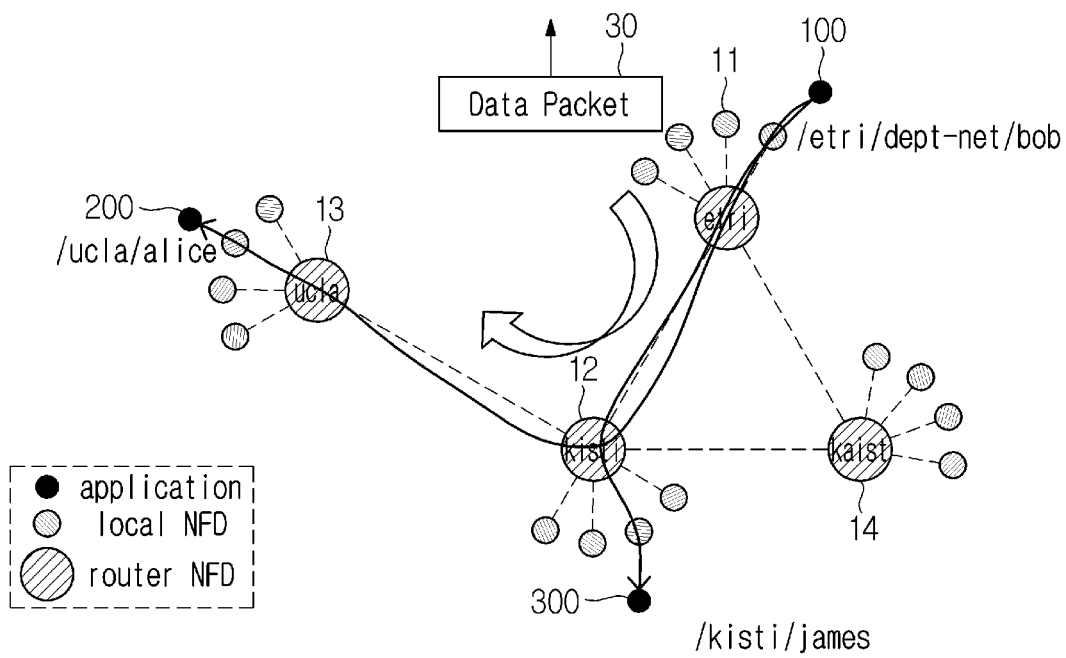
FIG. 17 is a view illustrating an example of caching a requested data in announce-pull data broadcasting according to another embodiment of the present disclosure.

FIG. 17 is a view illustrating an example of caching a requested data in announce-pull data broadcasting according to another embodiment of the present disclosure.

Referring to FIG. 17, the router NFD includes etri 11, kisti 12, ucla 13 and kaist 14.

The bob 100 sends a Data packet 30 to alice 200 through etri 11, via kisti 12 and then through ucla 13. Next, the Data packet 30 is sent to James 300 via kisti 12.

The Data packet 30 means a Data packet corresponding to Interest packet 20 and means, as data possessed by bob 100, data that alice 200 requests to bob 100.

The Data packet 30 is cached first to kisti 12. Since it is decided that the Data packet 30 is sent to alice 200, the Data packet 30 is sent first to alice 20. Next, when receiving Interest packet 20, which requests data of bob 100, from James 300, the Data packet 30, which is cached in kisti 12, is sent to James 300.

In addition, kisti 12 may send the Data packet 30 to alice 200 and james 300.

According to the present invention, as a middle node caches data and sends the cached data individually to multiple peers, when data are sent from one node to multiple different nodes, sending of redundant data may be prevented.

Figure 18:
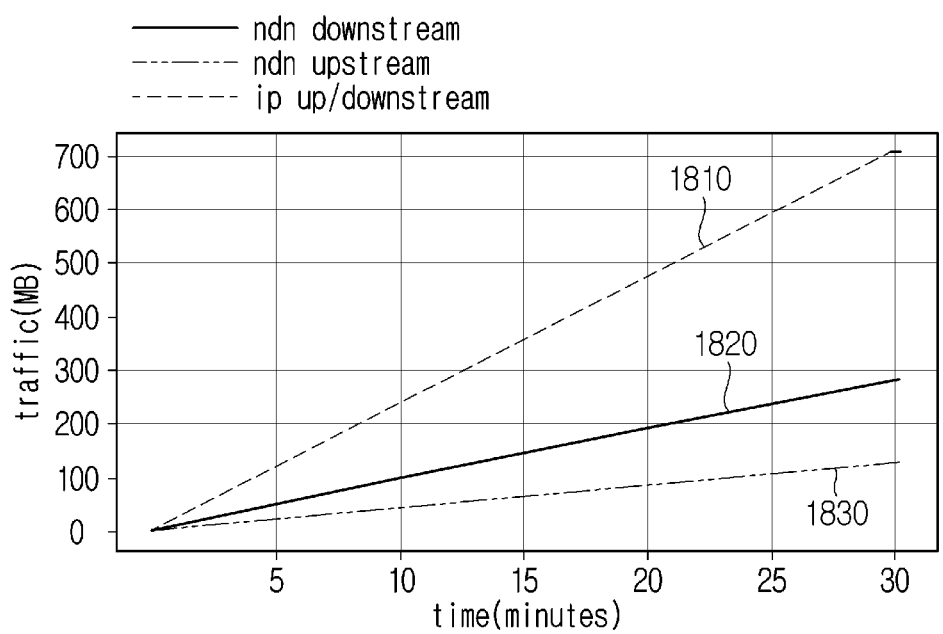
FIG. 18 is a view illustrating the effect of a traffic amount according to another embodiment of the present disclosure.

FIG. 18 is a view illustrating the effect of a traffic amount according to another embodiment of the present disclosure.

Referring to FIG. 18, the x-axis means time, and the y-axis means traffic.

Experimental conditions are as follows.

Compare IP-based up/down streams and NDN-based up/down streams.

A network includes 5 NDN domains, and the 5 NDN domains have 5, 10, 15 and 20 blockchain nodes respectively.

Send 1 kb transactions at a constant rate.

Upstream and downstream traffics are measured at every node.

Traffic redundancy ratio means a value obtained by dividing traffic by chain storage size.

Caching ratio means a value obtained by dividing a difference between downstream and upstream by downstream.

Referring to FIG. 18, traffic includes 100 nodes and 1 kb size transactions.

Among IP up/downstream 1810, NDN downstream 1820 and NDN upstream 1830, the IP up/downstream 1810 has the largest slope, the NDN downstream 1820 has the second largest slope, and the NDN upstream 1830 has the smallest slope.

Accordingly, as the NDN downstream 1820 and the NDN upstream 1830 have a smaller traffic amount than the IP up/downstream 1810, the present invention has an effect of reducing traffic amounts.

Figure 19:
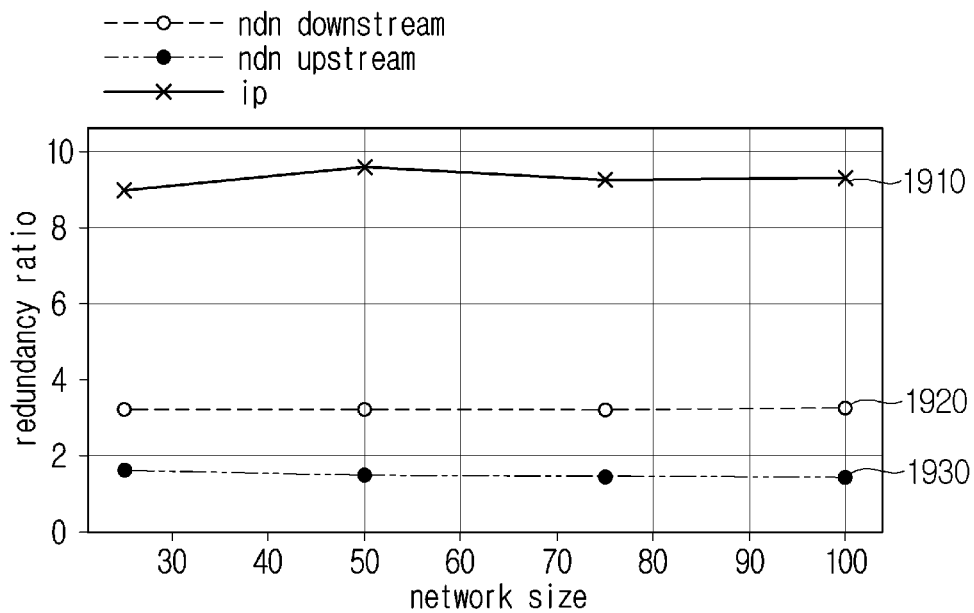
FIG. 19 is a view illustrating the effect of a traffic redundancy ratio according to another embodiment of the present disclosure.

FIG. 19 is a view illustrating 1G the effect of a traffic redundancy ratio according to another embodiment of the present disclosure. Referring to FIG. 19, the x-axis means a network size, and the y-axis means a traffic redundancy ratio. Herein, the network size means the number of nodes. Traffic includes 100 nodes and 1 kb size transactions.

Traffic redundancy ratio means a value obtained by dividing traffic by chain storage size. The traffic redundancy ratio of IP 1910 ranges 8 to 10. The traffic redundancy ratio of NDN downstream 1920 is 3. The traffic redundancy ratio of NDN upstream 1930 is 1.7.

As the network size increases, IP 1910 has the largest traffic redundancy ratio. Accordingly, since the NDN downstream 1920 and the NDN upstream 1930 have smaller traffic redundancy ratios than IP 1910, the present invention has an effect of reducing the traffic redundancy ratio.

Figure 20:
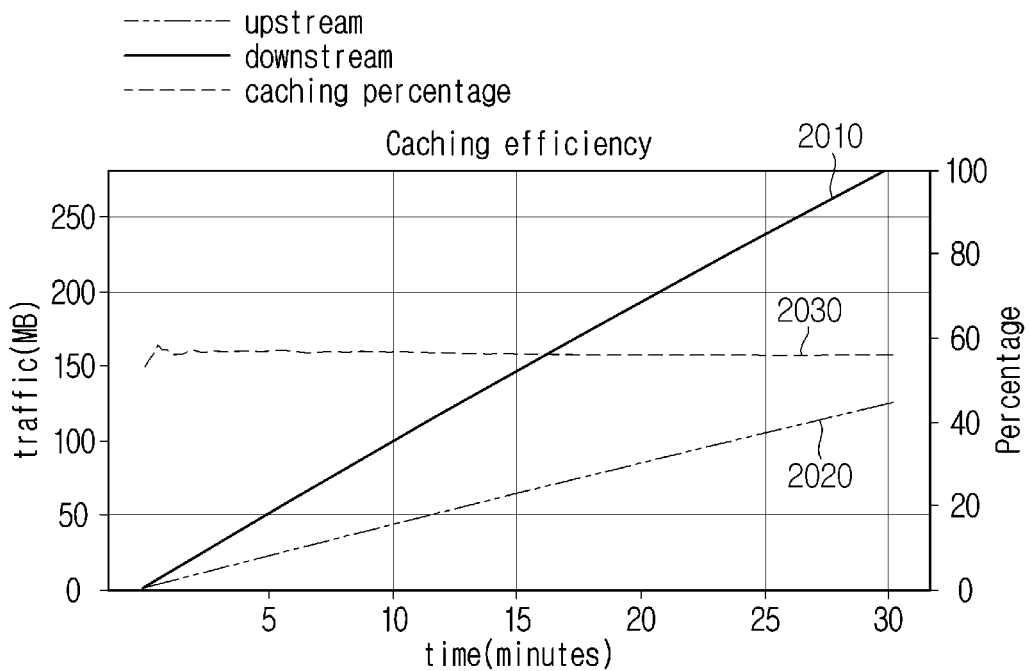
FIG. 20 is a view illustrating caching efficiency according to another embodiment of the present disclosure.

FIG. 20 is a view illustrating caching efficiency according to another embodiment of the present disclosure. Referring to FIG. 20, the x-axis means time, and the y-axis means traffic.

NDN downstream 2010 shows a linear increase of traffic over time. NDN upstream 2020 shows a linear increase of traffic over time. The slope of the NDN downstream 2010 is larger than the slope of the NDN upstream 2020.

Caching ratio 2030 means a value obtained by dividing a difference between the NDN downstream 2010 and the NDN upstream 2020 by the NDN downstream 2010.

According to the present invention, the caching ratio remains constant at around 50%.

Figure 21:
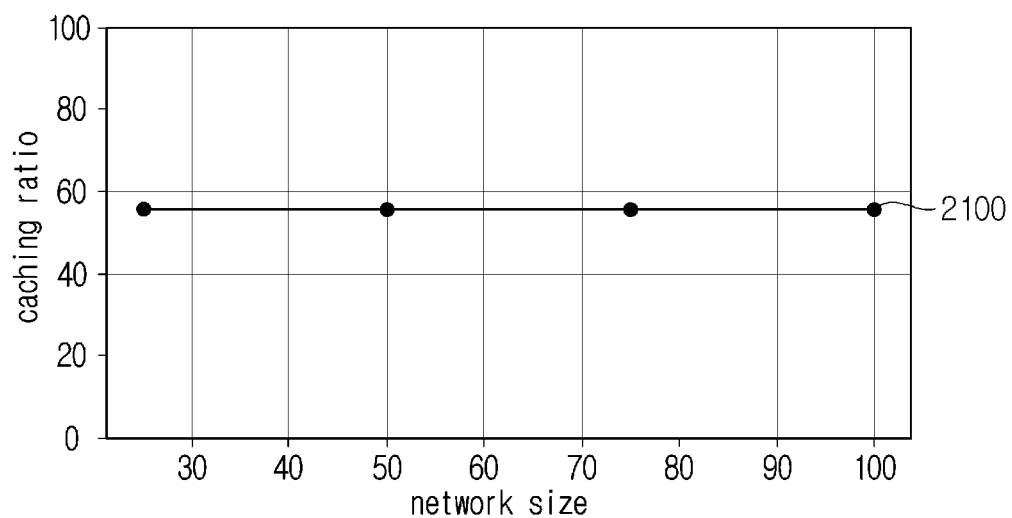
FIG. 21 is a view illustrating caching ratios for network sizes according to another embodiment of the present disclosure.

FIG. 21 is a view illustrating caching ratios for network sizes according to another embodiment of the present disclosure.

The x-axis means a network size, and the y-axis means a caching ratio. Herein, the network size means the number of nodes.

Referring to FIG. 21, as the network size increases, the caching ratio 2100 remains constant between 50% and 60%.

Figure 22:
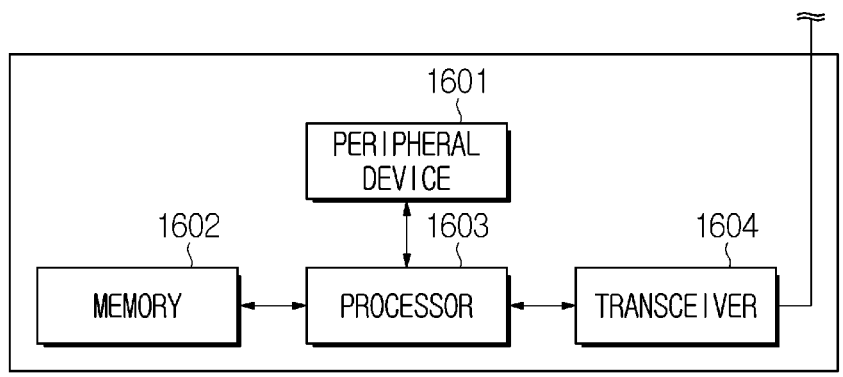
FIG. 22 is a view illustrating a configuration of an apparatus for verifying data integrity according to an embodiment of the present disclosure.

FIG. 22 is a view illustrating a configuration of a blockchain apparatus according to an embodiment of the present disclosure.

Referring to FIG. 22, the blockchain apparatus 1600 may include a memory 1602, a processor 1603, a transceiver 1604 and a peripheral device 1601. In addition, as an example, the blockchain apparatus 1600 may further include another configuration and is not limited to the above-described embodiment. Herein, as an example, the blockchain apparatus (device) may be an apparatus operating based on the above-described NDN system.

More specifically, the blockchain apparatus 1600 of FIG. 22 may be an illustrative hardware/software architecture such as an NDN device, an NDN server, and a content router. Herein, as an example, the memory 1602 may be a non-removable memory or a removable memory. In addition, as an example, the peripheral device 1601 may include a display, GPS or other peripherals and is not limited to the above-described embodiment.

In addition, as an example, like the transceiver 1604, the above-described blockchain apparatus 1600 may include a communication circuit. Based on this, the apparatus 1600 may perform communication with an external device.

In addition, as an example, the processor 1603 may be at least one of a general-purpose processor, a digital signal processor (DSP), a DSP core, a controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described blockchain apparatus 1600.

Herein, the processor 1603 may execute computer-executable commands stored in the memory 1602 in order to implement various necessary functions of node. As an example, the processor 1603 may control at least any one operation among signal coding, data processing, power controlling, input and output processing, and communication operation. In addition, the processor 1603 may control a physical layer, an MAC layer and an application layer. In addition, as an example, the processor 1603 may execute an authentication and security procedure in an access layer and/or an application layer but is not limited to the above-described embodiment.

In addition, as an example, the processor 1603 may perform communication with other devices via the transceiver 1604. As an example, the processor 1603 may execute computer-executable commands so that a node may be controlled to perform communication with other nodes via a network. That is, communication performed in the present invention may be controlled. As an example, other nodes may be an NDN server, a content router and other devices. As an example, the transceiver 1604 may send a RF signal through an antenna and may send a signal based on various communication networks.

In addition, as an example, MIMO technology and beam forming technology may be applied as antenna technology but are not limited to the above-described embodiment. In addition, a signal transmitted and received through the transceiver 1604 may be controlled by the processor 1603 by being modulated and demodulated, which is not limited to the above-described embodiment.

In order to implement a method according to the present disclosure, the illustrative steps may include an additional step or exclude some steps while including the remaining steps. Alternatively, some steps may be excluded while additional steps are included.

Various embodiments of the present disclosure do not list all possible combinations, but are intended to describe representative aspects of the present disclosure, and matters described in various embodiments may be applied independently or in combination of two or more.

In addition, various embodiments of the present disclosure may be implemented by hardware, firmware, software, or a combination thereof. For implementation by hardware, one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like. For example, it is self-evident that it can be implemented in the form of a program stored in a non-transitory computer-readable medium that can be used at the end or edge, or in the form of a program stored in a non-transitory computer-readable medium that can be used at the edge or in the cloud. In addition, it may be implemented by a combination of various hardware and software.

The scope of the present disclosure includes software or machine-executable instructions (eg, operating system, application, firmware, program, etc.) that cause an operation according to the method of various embodiments to be executed on a device or computer, and such software or and non-transitory computer-readable media in which instructions and the like are stored and executed on a device or computer.

Since the present disclosure described above can be various substitutions, modifications and changes within the scope without departing from the technical spirit of the present disclosure for those of ordinary skill in the art to which the present disclosure belongs, the scope of the present disclosure is not limited by the above-described embodiments and the accompanying drawings.

What is claimed is:

1. A method for announce-pull data broadcasting among blockchain nodes in a blockchain based on information-centric networking (ICN), the method comprising:
    transmitting, by a blockchain node, data announcement messages in the form of an ICN Interest packet, which indicates that the blockchain node possesses data, to peers of the blockchain node,
    wherein the peers of the blockchain node are also blockchain nodes;
    receiving, by the blockchain node, a data request message in the form of an ICN Interest packet, which requests the data, from one of the peers of the blockchain node,
    wherein the same ICN Interest packets from the peers of the blockchain node are aggregated at a middle ICN node; and
    transmitting, by the blockchain node, a data response message in the form of an ICN Data packet, which encloses the data corresponding to the data request message, to the peer of the blockchain node that sent the data request message,
    wherein the ICN Data packets are cached at the middle node.

2. The method of claim 1, further comprising:
    validating, by a blockchain node, data integrity of the received Data packet, when receiving a Data packet from another blockchain node;
    and announcing, by a blockchain node, the validated Data packet to the blockchain node's peers.

3. The method of claim 2, wherein the validating of the data integrity comprises comparing the hash value included in the data name against the hash value calculated from the received Data packet.

4. The method of claim 3, wherein the validating of the data integrity comprises determining that the data integrity is validated, when the hash value included in the data name and the hash value calculated from the received Data packet are the same.

5. The method of claim 1, wherein the data announcement message comprises at least one of a transaction announcement message and a block announcement message.

6. The method of claim 1, wherein the announcement message comprises a hash value of a data, which is available as a unique identifier of data.

7. A method for processing a transaction in a blockchain based on ICN, the method comprising:
    transmitting, by a blockchain node, transaction announcement messages to peers of the blockchain node;
    receiving, by the blockchain node, a transaction request message corresponding to the transaction announcement message from one of the peers of the blockchain node;
    inserting, by the blockchain node, a transaction corresponding to the received transaction request message into an ICN Data packet; and
    transmitting, by the blockchain node, a transaction response message in the format of the ICN Data packet to the peer of the blockchain node that sent the transaction request message,
    wherein the peer of the blockchain node is configured to receive the transaction response message, extract a transaction comprised in the transaction response message, and add the transaction to a holding list, and
    wherein the transaction pull module of the blockchain node informs the miner module of new transactions, whenever the new transactions are added.

8. The method of claim 7, wherein the miner module of the blockchain node begins mining a new block again, which includes newly added transactions.

9. The method of claim 7, wherein the controller of the blockchain node's peer transmits a response for a transaction announcement of the blockchain node, when the transaction announcement message is normal.

10. The method of claim 7, wherein the transaction fetcher module of the peer of the blockchain node is configured to concurrently receive multiple announcements from other blockchain nodes.

11. The method of claim 7, wherein the blockchain node transmits a transaction in the transaction response message to the peer of the blockchain node that sent the transaction request message.

12. A method for processing a block in a blockchain based on ICN, the method comprising:
    transmitting, by a blockchain node, block announcement messages to peers of the blockchain node;
    receiving, by the blockchain node, a block request message corresponding to the block announcement message from the blockchain node's peer that received the block announcement message;
    inserting, by the blockchain node, a block corresponding to the block request message into an ICN Data packet;
    transmitting, by the blockchain node, a block response message comprising the ICN Data packet to the peer of the blockchain node that sent the block request message; and
    validating, by the peers of the block node peers node that receive the block response message, the block included in the block response message,
    wherein the block fetcher module of the peer of the blockchain node that received block announcement is configured to add newly fetched blocks to a local blockchain by periodically requesting the insertion of the newly fetched blocks to a chain manager module.

13. The method of claim 12, wherein the controller of the peer of the blockchain node which received a block announcement of the blockchain node, is configured to transmit a response for the block announcement to the blockchain node through an ICN transport module, when the block announcement message is verified normal.

14. The method of claim 12, wherein the block fetcher module of the peer of the blockchain node can is configured to receive multiple block announcements from other blockchain nodes concurrently.

15. The method of claim 12, wherein the blockchain node is configured to transmit a block in the block response message to the peer of the blockchain node that sent the block request message.

\* \* \* \* \*